(12) United States Patent
Berkey et al.*

(10) Patent No.: US 6,282,342 B1
(45) Date of Patent: *Aug. 28, 2001

(54) MONOLITHIC COAXIAL DEVICE

(75) Inventors: George E. Berkey, Pine City; Daniel A. Nolan, Corning, both of NY (US)

(73) Assignee: Corning, Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,395

(22) Filed: Jun. 25, 1999

Related U.S. Application Data

(60) Provisional application No. 60/091,092, filed on Jun. 29, 1998.

(51) Int. Cl.[7] .................................................. G02B 6/26
(52) U.S. Cl. ................................. 385/43; 385/15; 385/28
(58) Field of Search ................................. 385/15, 28, 43

(56) References Cited

U.S. PATENT DOCUMENTS

| | | | |
|---|---|---|---|
| 4,877,300 | * 10/1989 | Newhouse et al. | 385/43 |
| 4,946,250 | * 8/1990 | Gonthier et al. | 385/43 |
| 5,295,205 | 3/1994 | Miller et al. | 385/43 |
| 5,708,740 | 1/1998 | Cullen | 385/39 |
| 5,828,802 | 10/1998 | Stolen et al. | 385/27 |

FOREIGN PATENT DOCUMENTS

| | | |
|---|---|---|
| 213 778 | 4/1986 | (EP) . |
| 2 179 171A | 2/1987 | (GB) . |

OTHER PUBLICATIONS

OFC Conference on Optical Fiber Communication, Tutorial: "Dense WDM Techniques", Charles A. Brackett, Jan. 22–26, 1990, p. 256.

* cited by examiner

*Primary Examiner*—Rodney Bovernick
*Assistant Examiner*—Ellen E. Kim
(74) *Attorney, Agent, or Firm*—Daniel P. Malley; Eric M. Smith

(57) ABSTRACT

The present invention provides environmentally stable interferometric and lattice devices that exhibit low excess loss and polarization dependent loss. The interferometric and lattice devices of the present invention are inexpensive and simple to make. The modal noise at the splices between the device pigtails and the system fiber is minimized or eliminated.

The present invention is an optical device for filtering a light signal. The optical device has a tunable spectral response. The optical device includes an optical fiber having a core region and a cladding with refractive index $n_2$. The first core region includes a core having a refractive index $n_1$ and a first fiber coupling regulator integral with the first optical fiber. The first fiber coupling regulator couples the light signal between a first optical path and second optical path and substantially prevents the light signal from coupling into a third optical path.

64 Claims, 18 Drawing Sheets

STAGE 1

STAGE 2

STAGE M

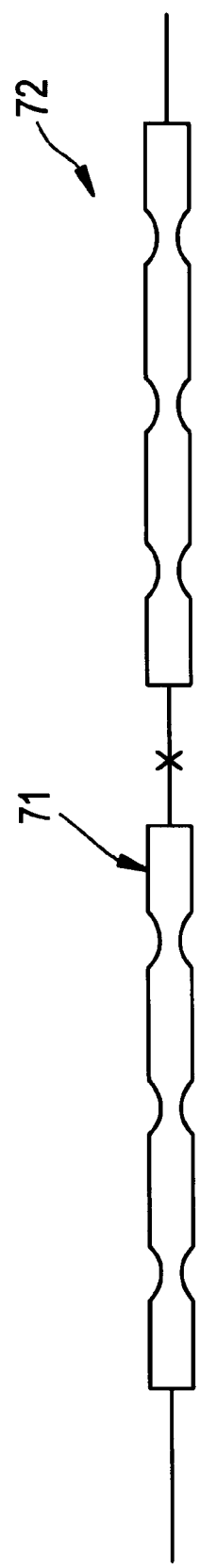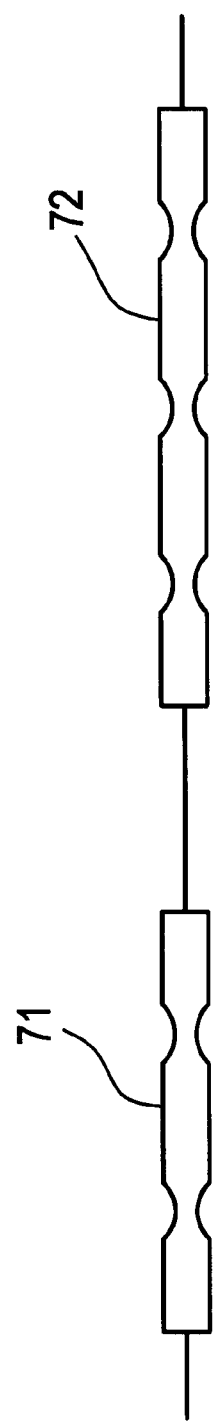

US 6,282,342 B1

MONOLITHIC COAXIAL DEVICE

CROSS-REFERENCE TO RELATED APPLICATIONS

This is a U.S. patent application Ser. No. 60/091,092 filed on Jun. 29, 1998, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to monolithic filters, and particularly to single-fiber coaxial Mach-Zehnder and lattice devices and their applications.

2. Technical Background

There is an emerging need for narrowband wavelength division multiplex (WDM) couplers and filters. Important applications include broadband gain flattening filters for rare earth and Raman amplifiers. For example, such devices can be utilized in the 1550 nm window for modifying the gain spectrum of erbium fiber amplifiers. They will also be widely used in trunk lines as well as in fiber-to-subscriber architectures. These components must environmentally stable and very reliable.

Mach-Zehnder filters are known for their narrow-band wavelength capabilities. It has been proposed that filters having pass bands as narrow as 1 nm be formed by connecting two evanescent couplers with unequal fiber lengths between them. However, it is difficult to reproduce an environmentally stable device with this approach. The connecting fibers are subject to external destabilizing conditions such as temperature changes and random bending forces.

An environmentally stable Mach-Zehnder device that is insensitive to temperature gradients and able to withstand forces that would tend to cause inadvertent bending has been proposed. The device includes an elongated body of matrix glass through which first and second dissimilar optical fibers extend. The body includes a phase shift region in which the fibers have different propagation constants, whereby optical signals propagate through the optical fibers at different velocities in the phase shift region. At opposite ends of the phase shift region the body further includes two spaced, tapered coupler regions where the diameter of the body and the diameters of the fibers are smaller than in the phase shift region. Even though the propagation constants of the fibers are different in the phase shift region, the difference in propagation constants of the fundamental modes propagating in those fibers inside the tapered coupling regions is insignificant due to the small size of the cores in the tapered regions wherein coupling occurs.

It has been proposed to use overclad Mach-Zehnder couplers for gain flattening filter applications. The typical sinusoidal dependence of the two-coupler device is useful for filtering the red band or the blue band gain of Erbium-doped fiber amplifiers. Broadband gain filters require a nonsinusoidal filter function. Such broadband functionality using a three coupler-two core overclad lattice structure has been demonstrated. However, it has been discovered that two-fiber overclad Mach-Zehnder narrowband filters tend to be polarization sensitive, because the cores deform in the phase shift region of the device as the tube collapses onto the fibers during manufacture of the device.

A coaxial geometry has been proposed to eliminate the polarization sensitivity. Such devices are formed from an optical fiber that defines two waveguides, a rod waveguide (the central core of the fiber) and a coaxial tubular or ring waveguide. The refractive indices of the central core and the ring waveguides are elevated relative to the refractive index of the cladding layer that is intermediate the core and ring waveguides and relative to the refractive index of the outer cladding that surrounds the ring waveguide. Implementation of the design is difficult for the following reasons. In order to couple light from the core waveguide to the ring mode in the ring waveguide, it is required that the propagation constants of these modes in the tapered regions be similar. But dissimilar propagation constants are required for good filtration. It is difficult to form a coaxial fiber coupler that meets these requirements. More importantly, in a coaxial device formed of a fiber having a central core waveguide and a ring waveguide, the ring mode may be so tightly bound to the ring waveguide that it is not readily stripped therefrom by the protective coating of the output fiber pigtail. This might necessitate the utilization of a further bath of index matching fluid to prevent light that propagates in the ring waveguide from reaching the output of the device. If the ring mode reaches the splice between the output pigtail and the system fiber, modal noise is generated. In addition, the characteristic of insertion loss with respect to wavelength of Mach-Zehnder devices made from a coaxial fiber having core and ring waveguides was highly non-reproducible.

SUMMARY OF THE INVENTION

The present invention provides environmentally stable interferometric and lattice devices that exhibit low excess loss and low polarization dependent loss. The interferometric and lattice devices of the present invention are inexpensive and simple to make. The modal noise at the splices between the device pigtails and the system fiber is minimized or eliminated.

One aspect of the present invention is an optical device for filtering a light signal. The optical device has a tunable spectral response. The optical device comprises: a first optical fiber having a first core and a first cladding with refractive index $n_2$, the first core includes a first central region having a refractive index $n_1$; and a first fiber coupling regulator integral with the first optical fiber, the first fiber coupling regulator couples the light signal between a first optical path and second optical path and substantially prevents the light signal from coupling into a third optical path.

In another aspect, the present invention includes a coaxial device for operation at an operating wavelength $\lambda_o$, the device comprising: a single optical fiber having a core having a maximum refractive index $n_1$ surrounded by a cladding having a maximum refractive index $n_2$, and a refractive index pedestal having a maximum refractive index $n_5$ situated between the core and cladding, wherein $n_1 > n_5 > n_2$; at least one tapered region in the fiber, that portion of the fiber that extends from one end of the tapered region having a protective coating thereon and constituting a fiber pigtail, the taper angle of the tapered region being sufficiently great to cause coupling between the LP01 and the LP02 modes, but not so great as to cause coupling to the LP03 mode, wherein the optical fiber has a cutoff wavelength $\lambda_{co}$ more than 200 nm less than the operating wavelength $\lambda_o$.

In another aspect, the present invention includes a coaxial device comprising: a single optical fiber having a core having a maximum refractive index $n_1$ surrounded by a cladding having a maximum refractive index $n_2$, and a refractive index pedestal having a maximum refractive index $n_5$ situated between the core and cladding, wherein $n_1 > n_5 > n_2$; at least first and second axially spaced tapered regions along the fiber; a phase shift region of the fiber extending between the tapered regions; and a first fiber pigtail extending from that end of the first tapered region opposite the phase shift region, the taper angles of the tapered regions being sufficiently great to cause coupling between the LP01 and the LP02 modes, but not so great as to cause coupling to the LP03 mode.

In another aspect, the present invention includes a method for filtering a light signal with an optical device having a predetermined spectral response, the optical device including a first optical fiber having a first core region and a first cladding with refractive index $n_2$, the first core region includes a first core having a refractive index $n_1$, the method comprising: providing a first fiber coupling regulator integral with the first optical fiber; directing the light signal into the first optical fiber; and coupling the light signal from an $LP_{01}$ mode into an $LP_{02}$ mode, wherein the first fiber coupling regulator couples the light signal between a $LP_{01}$ mode and $LP_{02}$ mode and substantially prevents the light signal from coupling into a $LP_{03}$ mode.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 19 is a gain flattening filter fabricated by cascading two three taper lattice devices;

FIG. 21 is a gain flattening filter produced by cascading a Mach-Zehnder device with a three taper lattice device;

DETAILED DESCRIPTION OF THE PREFERRED EMBODIMENTS

Figure 1:
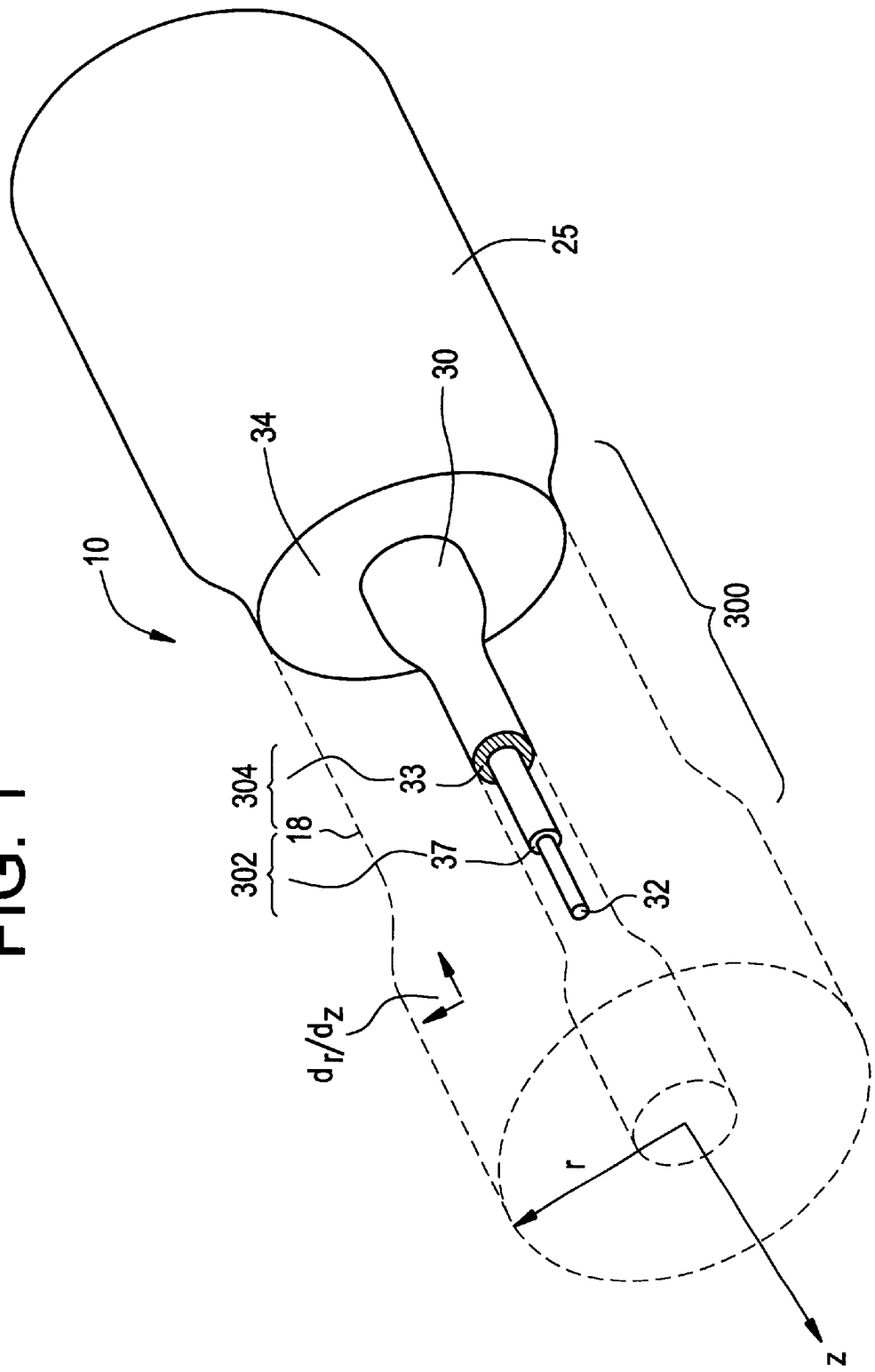
FIG. 1 is a diagram of a first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the coaxial optical device 10 of the present invention is shown in FIG. 1, and is designated generally throughout by reference numeral 10.

The following symbols are used herein to characterize features of the present invention. The term Δ is used to indicate the relative refractive index diferences between two light propagating materials. Thus, $\Delta_{1-2}$ equals $(n_1^2 - n_2^2)/2n_1^2$, $\Delta_{5-2}$ equals $(n_5^2 - n_2^2)/2n_2^2$, and $\Delta_{2-3}$ equals $(n_2^2 - n_3^2)/2n_2^2$, where $n_1$, $n_2$, $n_3$ and $n_5$ are the refractive indices of the central region of the fiber core, fiber cladding, device overcladding, and fiber pedestal in the core region, respectively. The core region may also include a trough.

In accordance with the invention, the present invention for a monolithic coaxial device 10 includes a coupling regulator 300. Coupling regulator 300 includes an optical coupler 302 and a coupling inhibitor 304. Coupler 302 couples a light signal between two optical paths, the LP01 mode and the LP02 mode. Coupling inhibitor 304 allows the light signal to couple between the LP01 mode and the LP02 mode, but prevents the light signal from coupling into any higher order modes such as the LP03 mode. Coupling regulator 300 is tunable to provide a predetermined desired spectral response. In addition, optical device 10 can be cascaded or concatenated to provide spectral responses having very complex shapes.

The coupling regulator 300 includes either one, two or three couplers and coupling inhibitors, depending on the application. Coupling regulator 300 provides for a variety of applications including: channel filtering, a filter for use in soliton transmission systems to eliminate jitter, bandpass filters, notch filters, Raman amplifier filters, rare earth amplifier filters and for gain flattening filters having a spectral response that conforms to any desired or predetermined shape. Optical device 10 has other features and advantages. It is relatively simple and inexpensive to make. It is an environmentally stable device that exhibits low excess loss, low polarization dependent loss, and eliminates or minimizes modal noise at splices between device pigtails and system fiber.

As embodied herein, and depicted in FIG. 1, optical device 10 includes optical fiber 25 and coupling regulator 300. Optical fiber 25 includes core region 30 and cladding 34. Coupling regulator 300 is integral with optical fiber 25 and includes coupler 302 and coupling inhibitor 304. The simple single-taper device 10 shown in FIG. 1 is an example of a non-interferometric filter. The principles discussed with respect to optical device 10 as depicted in FIG. 1 are applicable to two-taper Mach-Zehnder filters and three-taper lattice filters that are discussed below.

Coupler 302 may be of any suitable well-known type, but there is shown by way of example, tapered region 18, diameter of the central region 32, and refractive index trough 37 which is integrated into core region 30. If taper 18 is non-adiabatic, the light signal will propagate between the LP01 and higher modes, and trough 37 is not needed. In this case, the taper angle must be greater than some minimum taper angle to cause non-adiabatic coupling between the LP01 and LP02 modes.

The taper angle is typically defined by means of a taper ratio. The taper ratio is the change in the radius (dr) of optical fiber 25 over the change in length (dz). It is desirable that $dr/dz > r/Z_{02}$ where $Z_{02} = 2\pi/(\beta_{01} - \beta_{02})$. However, the taper angle cannot be too steep as that would cause coupling to the LP03 mode. Thus, the taper angle should not be so great that $dr/dz$ is greater than $r/Z_{03}$ where $Z_{03} = 2\pi/(\beta_{01} - \beta_{03})$. Moreover, a smaller taper angle is easier to control during the manufacturing process. In the above relationships, $\beta_{01}$, $\beta_{02}$ and $\beta_{03}$ are the propagation constants of the LP01, LP02 and LP03 modes in the tapered regions.

As discussed above, coupler 302 can be implemented using refractive index trough 37. If taper region 18 is adiabatic, it will not support coupling between the LP01 and LP02 modes and trough 37 is integrated into core region 30. Trough 37 will couple light between the LP01 modal path and the LP02 modal path, but not into higher modes.

One of ordinary skill in the art will also recognize that coupling between the LP01 and LP02 modes can also be implemented by increasing the core diameter.

Coupling inhibitor 304 may be of any suitable well-known type, but there is shown by way of example, tapered region 18 and refractive index pedestal 33 which is integrated into core 30. As discussed above, if taper region 18 is adiabatic, it will inhibit coupling between the LP01 and LP02 modes and trough 37 must be used. Coupling inhibitor 304 is also implemented with pedestal region 33. When a steep non-adiabatic taper region 18 is used, light will readily couple into the LP02 and higher modes. Pedestal region 33 is integrated into core 30 to prevent coupling into the LP03 or higher modes.

Figure 2:
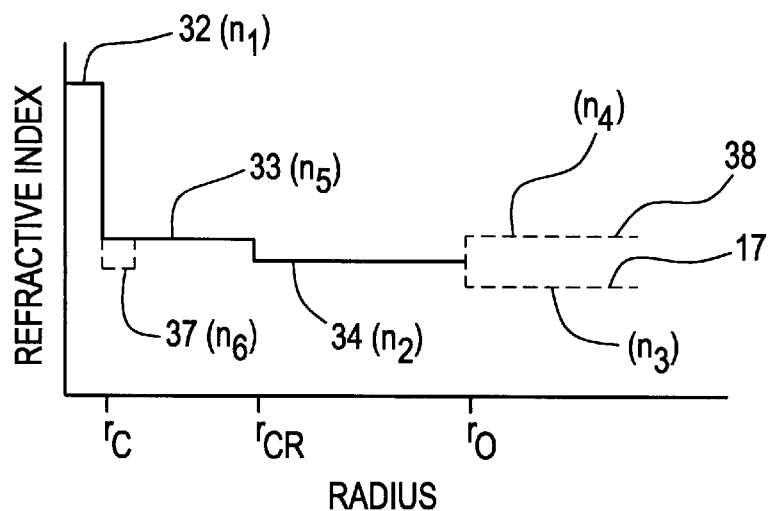
FIG. 2 is a representative refractive index profile of the device shown in FIG. 1.

As embodied herein and depicted in FIG. 2, a representative refractive index profile of optical device 10 according to the present invention. FIG. 2 shows the relationship between core 30, central core region 32, pedestal 33, cladding 34 and trough 37 with respect to the radius of optical fiber 25. Central core region 32 is characterized by a refractive index of $n_1$. Cladding 34 is characterized by a refractive index $n_2$. Pedestal 33 and trough 37 have refractive indices of $n_5$ and $n_6$, respectively. As shown in FIG. 2, $n_1 > n_5 > n_2 > n_6$. Note also that optical device 10 typically includes overclad region 17 which has refractive index $n_3$. Mode coupling more readily occurs between the LP01 and LP02 modes when the refractive index $n_3$ of body 17 is lower than the refractive index $n_2$ of the fiber cladding, as shown in FIG. 2. Since the fiber cladding is typically formed of silica, the tube index can be made lower than that of the cladding by forming the tube of silica doped with $B_2O_3$ or fluorine.

The refractive index $n_4$ of the fiber coating material 38 is greater than that of $n_2$, of the fiber cladding 34. Moreover, the fiber coating index $n_4$ should be equal to or greater than pedestal 33 index $n_5$, to allow the LP02 mode propagating from device 10 to be stripped from the fiber in the pigtail. Thus, modal noise is eliminated at the splices between the pigtail and the system fiber.

It is convenient to use chlorine as the pedestal refractive index increasing dopant, since it enables the precise formation of a pedestal having a very small refractive index $\Delta_{5-2}$ with respect to the fiber cladding. However, dopants other than chlorine can be used to create fibers having a pedestal region 33 (FIG. 3) in their refractive index profile. The dopant that is used to form the core region 32 can also be used to form the pedestal 33. Germania, which is commonly used to form fiber cores can be also used for the pedestal 33 dopant. Moreover, there are many more refractive index increasing dopants that could be used to form the core 32 and/or pedestal 33. Pedestal region 33 could also be formed of a glass such as silica, the fiber cladding region 34 being formed of silica doped with a refractive index decreasing dopant such as fluorine or boron.

In the specific couplers described herein, the device fiber 25 is surrounded in the coupling region by matrix glass body 17. The surrounding medium could also be any material having a refractive index $n_3$, that is lower than that of the fiber cladding such as plastic, air or the like. The difference in fiber propagation constants between the LP01 and LP02 modes in the tapered regions would be much greater if air were the surrounding medium. Therefore, a taper for such a device would have to be steeper, thus making the taper angle more difficult to control. Also, with air in the uptaper portion of the tapered region, light can couple from the LP02 to the LP03 mode. Thus, the taper must be very carefully formed when air is the surrounding medium. These negative effects are eliminated when the tube, having the higher refractive index $n_4$ is employed.

Figure 3:
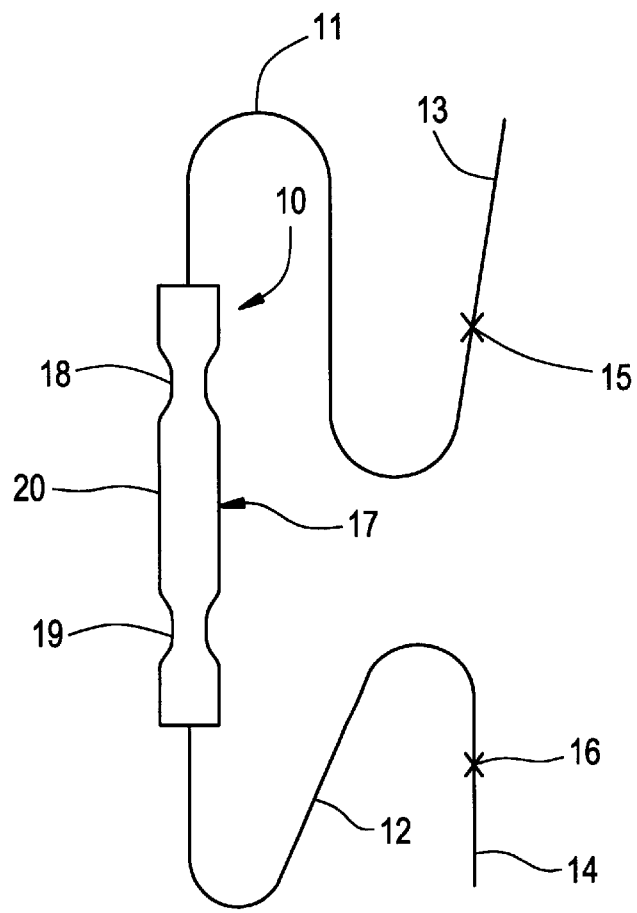
FIG. 3 shows the two coupler Mach-Zehnder configuration used in the second, third, and fourth embodiments of the present invention.

As embodied herein and shown in FIG. 3, a monolithic coaxial overclad Mach-Zehnder device 10 is disclosed. Alternative Mach-Zehnder embodiments according to second, third, and fourth embodiments of the present invention will be discussed below. Coated first and second optical fiber pigtails 11 and 12, which extend from device 10 are connected to system fibers 13 and 14 by splices 15 and 16, respectively. Device 10 includes a body 17 of matrix glass having tapered coupling regions 18 and 19 therein. Phase shift region 20 is situated between regions 18 and 19.

One factor that affects the filter function of the present invention is the wavelength dependence of the couplers, which depends on the taper rate and values of propagation constants of the LP01 and LP02 modes in the tapered regions. The taper angle must be greater than some minimum taper angle to cause nonadiabatic coupling between the LP01 and LP02 modes. The taper angle cannot be too steep as that would cause coupling to the LP03 mode. Moreover, a less steep angle is easier to control during the manufacturing process. It is desirable that $dr/dz > r/Z_{02}$ where $Z_{02} = 2\pi/(\beta_{01}-\beta_{02})$. However, the taper angle should not be so great that $dr/dz$ is greater than $r/Z_{03}$ where $Z_{03}=2\pi/(\beta_{01}-\beta_{03})$. In the above relationships, r is the fiber radius, z is the distance along the fiber longitudinal axis, and $\beta_1$, $\beta_2$ and $\beta_3$ are the propagation constants of the LP01, LP02 and LP03 modes in the tapered regions.

The coupling equation for the LP01 to LP02 mode is given in Optical Waveguide Concepts by C. Vassallo, Elsevier 1991.

The coupling that occurs in the tapered regions was found to be dependent upon the cutoff wavelength of the fiber. If the cutoff wavelength was near the operating wavelength, no coupling occurred. For a device operating in the 1500 nm region, a fiber having a cutoff wavelength about 200 nm below the operating wavelength produced some coupling in the tapered regions. When the fiber cutoff wavelength was about 950 nm, significant coupling occurred. This illustrates an important design tradeoff.

Excellent coupling results were obtained when the cutoff wavelength was more than 500 nm below the operating wavelength. This result is obtained because $\beta_1$ and $\beta_2$ are relatively close together. However, the close proximity of $\beta_1$ and $\beta_2$ causes modal dispersion effects that cause inter-modal interference to take longer. This results in a longer device. Of course, it is the inter-modal interference that is generated by the device that produces the filtering effects of the device. In order to produce a smaller device, $\beta_1$ and $\beta_2$ must be relatively far apart. This results in a higher cut-off wavelength. In the smaller devices, refractive index trough 37 is required to generate inter-modal coupling. This will be discussed below, with respect to the third and fourth embodiments of the present invention.

Another factor that affects the filter function of the present invention are the lengths "L" (e.g., when there is more than one in a three-taper device) of region 20 and the wavelength dependence of the phase shift regions which in turn depends on the propagation constants of the LP01 and LP02 modes in the untapered phase shift region 20.

Simple sinusoidal wavelength filters or WDM couplers exhibit excellent performance characteristics when couplers 18 and 19 have substantially identical coupling characteristics. The second coupler 19 is therefore preferably formed near the tube end opposite taper 18 by subjecting the appropriate region of the tube to stretching conditions that are identical to those used to form tapered coupler 19. Of course, for more complex shaped spectral responses, couplers 18 and 19 would not be identical.

Figure 4:
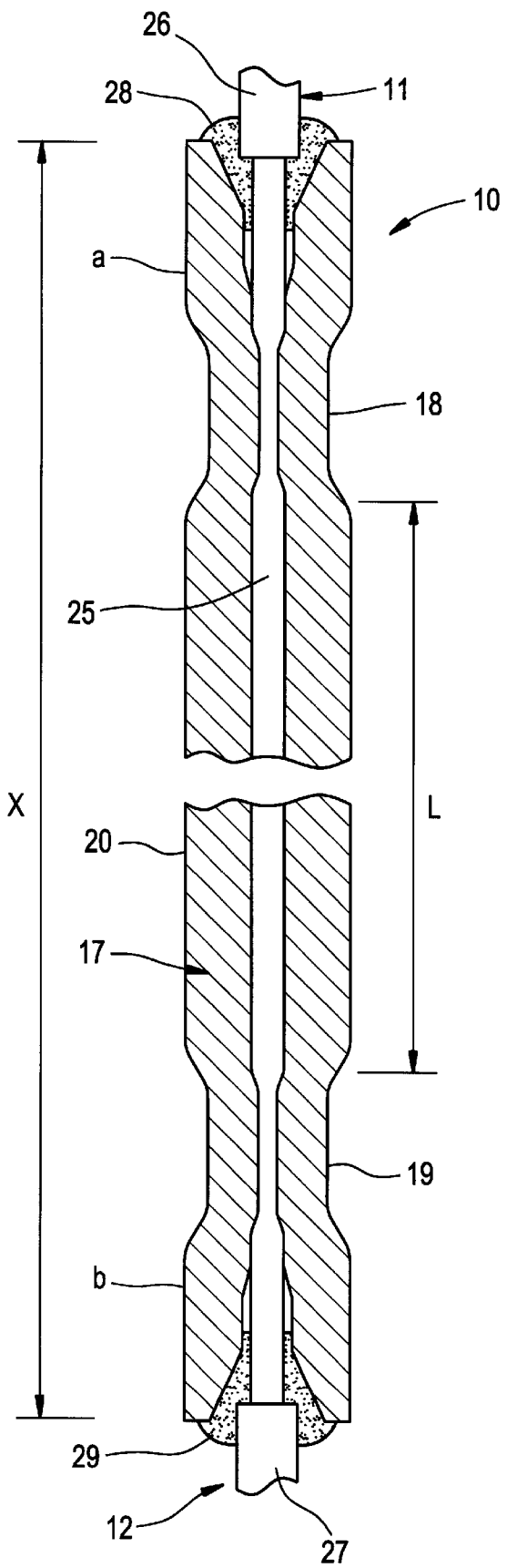
FIG. 4 is a cross-sectional view of the second embodiment of the present invention.

As discussed above, prototype Mach-Zehnder devices of the type shown in FIG. 3 and lattice devices of the type shown in FIG. 4, can be "tuned" to obtain desired transfer function. First, the desired refractive index profile is obtained by an appropriate selection of materials. Second, the optical and spectral characteristics of optical device 10 are measured during fabrication. The taper ratio, stretching or elongation distances of device 10 are adjusted to achieve the desired spectral characteristics. By this tuning process, the optimal material selection, taper ratios, stretching distances and phase shift spacing L are achieved for a given filter.

The fiber core should have a mode field diameter that is reasonably close to that of the system fibers to which the device pigtails will be fused or connected. Also, $B_2O_3$ can be added to the fiber core to form devices having improved thermal characteristics. As discussed below, core parameters such as refractive index and radius must be such that the device operating wavelength $\lambda_o$ is sufficiently greater than the single-mode cutoff wavelength $\lambda_{co}$.

As embodied herein and shown in FIG. 4, a second embodiment of the present invention is disclosed. Device 10 includes a single glass optical fiber 25 surrounded by glass body 17. The taper ratio is approximately equal to 3 to 1. A tube of silica, doped with 8 wt. % $B_2O_3$, was used to form a Mach-Zehnder device in accordance with a method that will be described below. The length of the tube (X) is 4.5 cm. The pull length of both tapered regions is 0.75 cm, and the spacing L between the tapered regions is 1.0 cm. The fiber core consists of silica doped with 15 wt. % $GeO_2$ and 3 wt. % $B_2O_3$, and the core-clad $\Delta_{1-2}$ is about 1.0%. The radii $r_c$, $r_{cr}$ and $r_{clad}$ are about 3 μm, about 12 μm and 62.5 μm, respectively. The cutoff wavelength is approximately 961 nm. The polarization dependent loss of the device is less than 0.1 dB.

Figure 5:
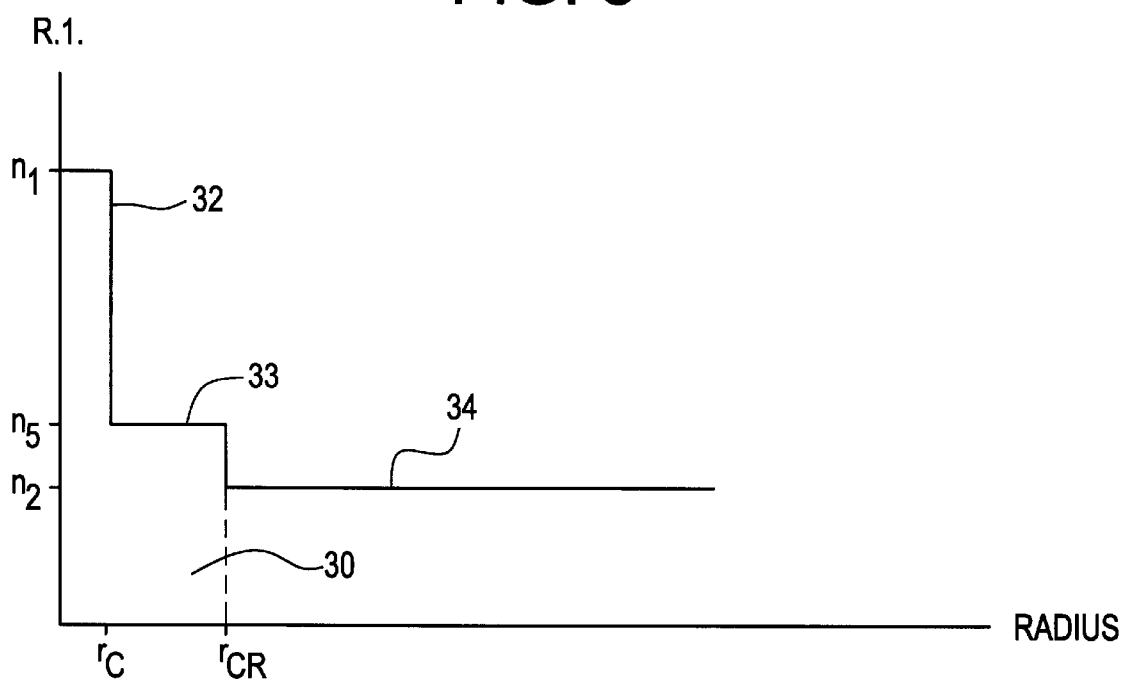
FIG. 5 is a refractive index profile of the second embodiment of the present invention.

FIG. 5 is a refractive index profile of fiber 25 and that of at least the inner portion of body 17. In the refractive index profile of FIG. 5, no attempt is made to represent indices and radii to scale and/or in exact relative magnitude. Device fiber 25 includes a core region 30 having a maximum refractive index $n_1$ and a cladding region 34 of lower refractive index $n_2$. The salient feature of this embodiment of the invention is a refractive index pedestal 33 situated between the center region 32 and cladding 34. The pedestal region 33 has a refractive index $n_5$ that is intermediate $n_1$ and $n_2$. For the clarity of illustration, core region, which includes the center 32 and pedestal region 33, are illustrated as being constant index regions of the fiber.

Alternatively, center region 32 and pedestal region 33 could have a varying refractive index profile such as a gradient profile, a profile formed of a plurality of steps, or the like, provided that the pedestal supports coupling to only only the LP02 mode as herein described. The refractive index profile of the pedestal should preferably either remain essentially constant or slightly decrease with respect to radius. The radii of the core, pedestal and fiber surface are $r_c$ and $r_{cr}$ respectively.

In the profile shown in FIG. 5, the propagation constants of the LP01 and LP02 modes that propagate in the fiber are very dissimilar in phase shift region 20, but they become sufficiently close in value in the tapered regions 18 and 19 as to achieve good mode coupling. Fibers having such profiles provide adequate phase differences between the modes in the phase shift region without compromising mode coupling in the tapered regions. The value of $\Delta_{1-2}$ in the second embodiment is approximately equal to 1.0%. The value of $\Delta_{5-2}$ should be small, and yet it should be sufficient to enable the coupling of light between the LP01 and LP02 modes of the fiber, while at the same time prevent coupling to the LP03 mode. The LP02 mode is a guided mode that propagates in the Mach-Zehnder device where the cladding is surrounded by a medium such as the matrix glass body. $\Delta_{5-2}$ should be less than 0.05% because larger values require a large taper-ratio. $\Delta_{5-2}$ should be greater than 0.01% to enable coupling to the LP02 mode in the tapered region, while preventing coupling to the LP03 mode. The value of $r_{cr}$ should be between 10 μm and 25 μm, and is preferably less than 15 μm.

Figure 6:
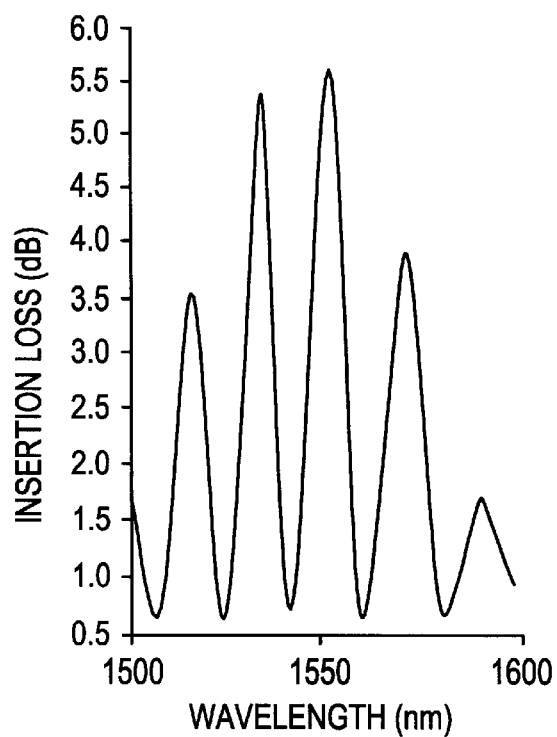
FIG. 6 is a plot of insertion loss v. wavelength for a Mach-Zehnder according to the second embodiment of the present invention.

FIG. 6 is a plot of insertion loss v. wavelength for optical device 10 in accordance with the second embodiment of the present invention. The spectral response of optical device 10 is that of a one-stage Mach-Zehnder channel filter. Optical device 10 exhibits excellent attenuation properties, having a high insertion loss in the 1550 nm region of the spectrum.

Figure 7:
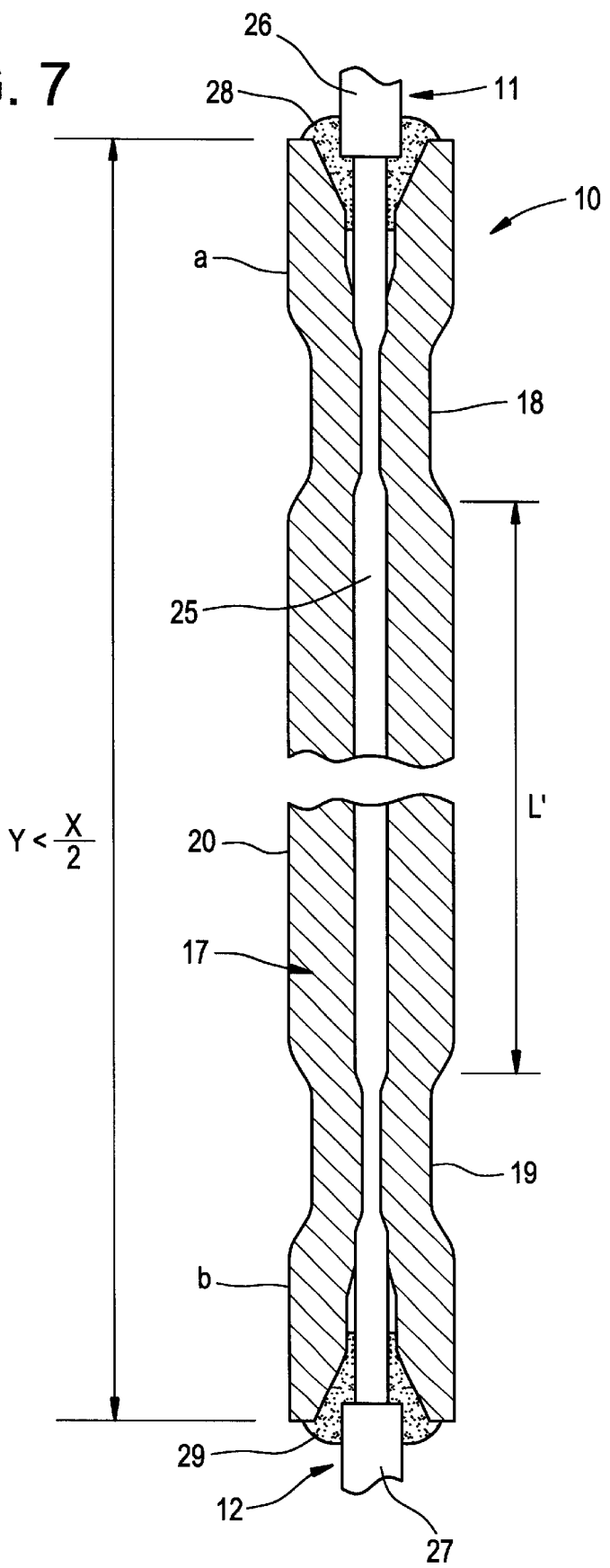
FIG. 7 is a cross-sectional view of the third and fourth embodiments of the present invention.

As embodied herein and depicted in FIG. 7, the third and fourth embodiments of optical device 10 are approximately one-half as long as the second embodiment. As discussed above, there is a trade-off between device size and ease of coupling. In both the third and fourth embodiments, refractive-index trough 37 is integrated into optical fiber 25 as part of optical coupler 302. Trough 37 enables inter-modal coupling between LP01 and LP02.

Figure 8:
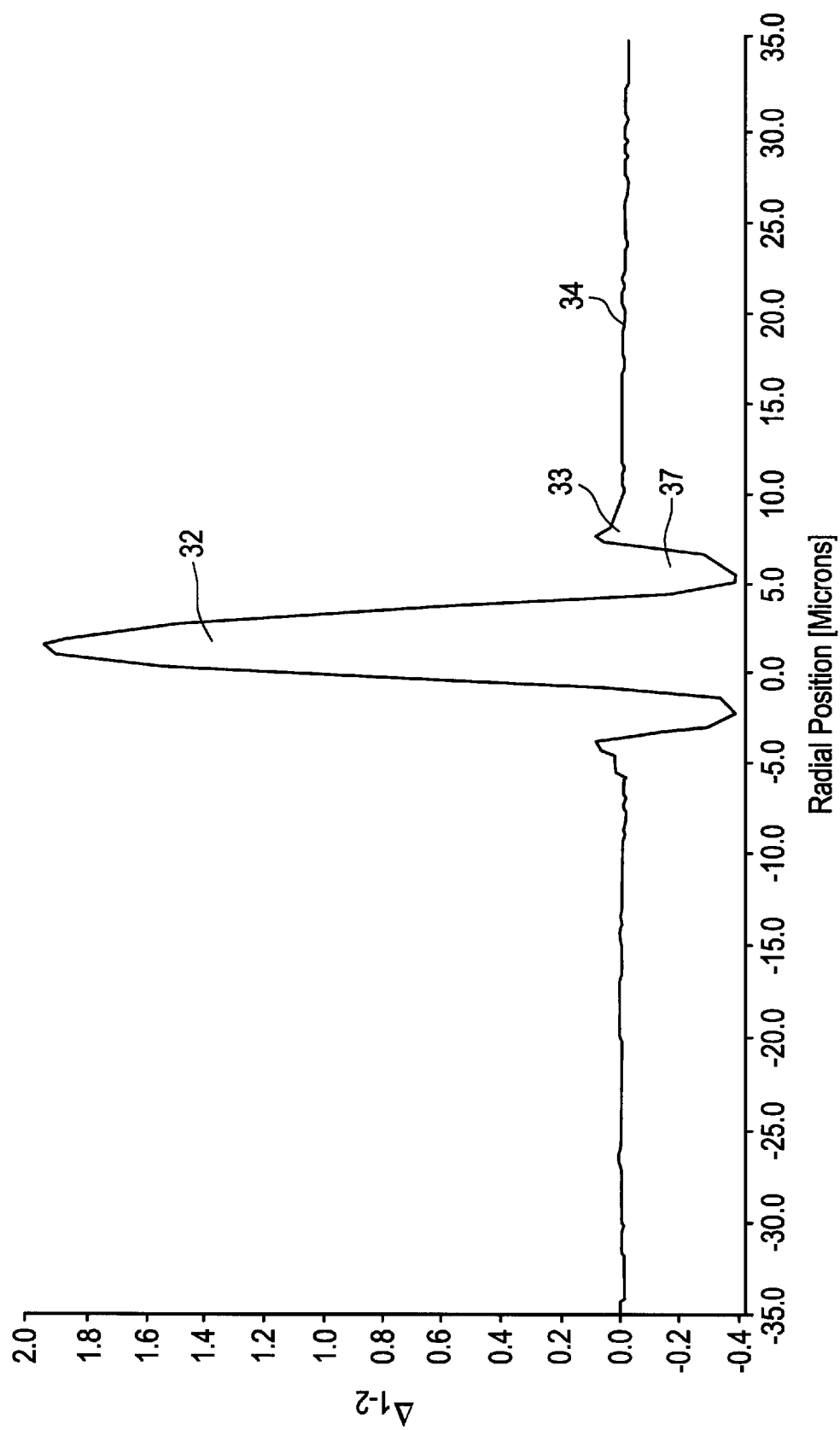
FIG. 8 is a refractive index profile according to the third embodiment of the present invention.

FIG. 8 is a refractive index profile of a Mach-Zehnder filter according to the third embodiment of the present invention. The value of $\Delta_{1-2}$ in the third embodiment is approximately equal to 2.0%. The core diameter is enlarged to approximately 7 microns to encourage inter-modal coupling. Note that trough 37 is very deep, having a $\Delta_{1-6}$ in the approximate range between 0.1% and 0.4%. Trough 37 is employed to offset the small taper ratio and the large $\Delta\beta$. Because of the large $\Delta\beta$, the cut-off wavelength is much higher. It is approximately equal to 1200 nm. Coupling inhibitor 304 includes a small taper region and pedestal 33. The taper ratio is less than 2 to 1. Normally, this taper ratio is adiabatic and inhibits inter-modal coupling. However, optical coupler 302 includes a very pronounced trough 37 which has the effect of overriding the effects of the small taper ratio. Pedestal 33 helps prevent coupling between the LP02 and LP03 or higher modes.

Figure 9:
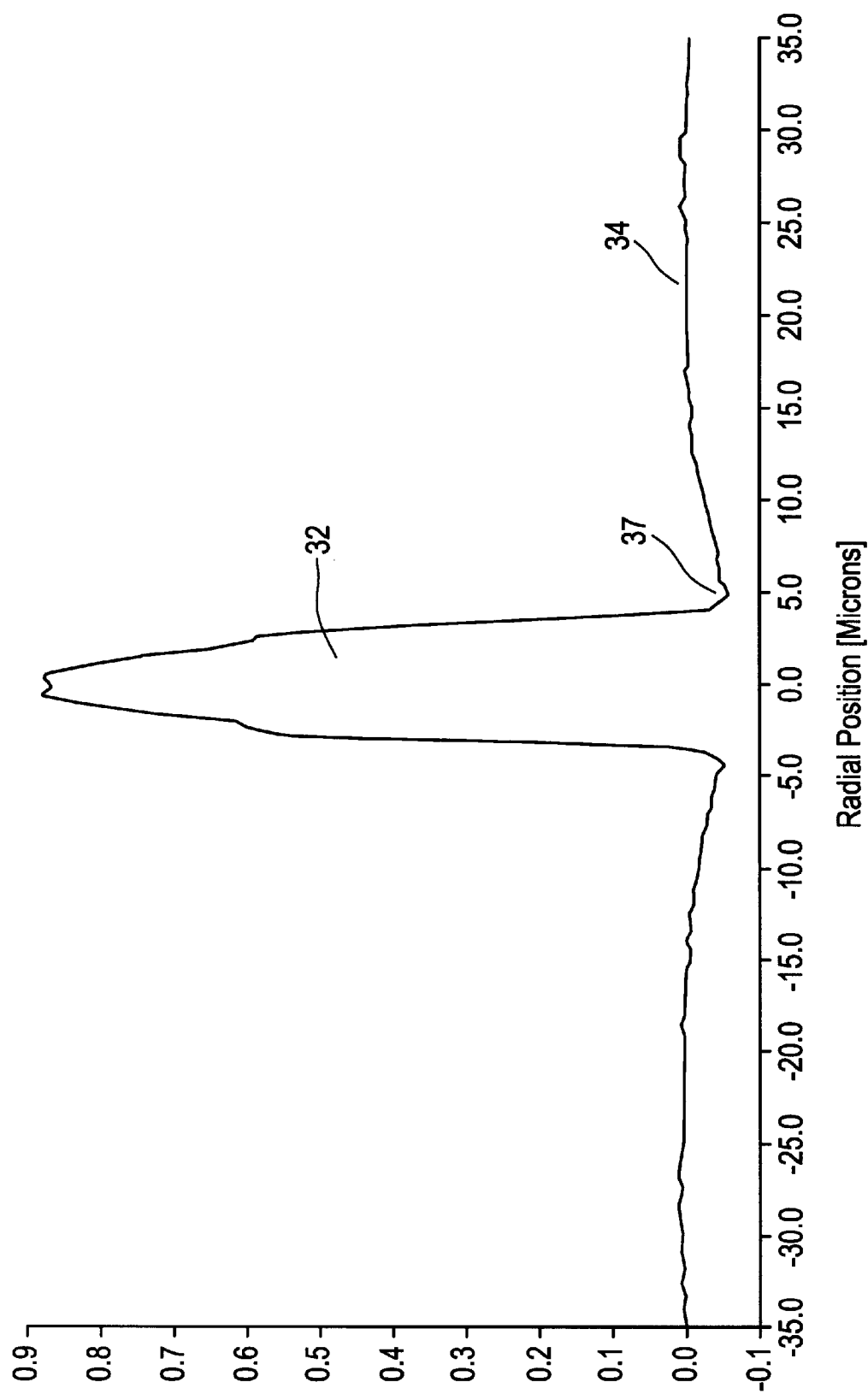
FIG. 9 is a refractive index profile according to the fourth embodiment of the present invention.

FIG. 9 is a refractive index profile according to the fourth embodiment of the present invention. The value of $\Delta_{1-2}$ in the third embodiment is approximately equal to 0.8%. The core diameter is enlarged to approximately 10 microns to encourage intermodal coupling. In this embodiment, trough 37 is more shallow, having a $\Delta_{1-6}$ in the approximate range between 0.03% and 0.07%. Trough 37 is employed to offset the small taper ratio and the large $\Delta\beta$, but in this instance its effects are gentler. Again, the cut-off wavelength is much higher than in the second embodiment. It is approximately equal to 1280 nm. The taper ratio is less than 2 to 1. As in the third embodiment, the coupling inhibitor includes a taper ratio that is normally adiabatic. Optical coupler 302 includes a small trough 37 that overrides these effects. Coupling inhibitor 304 does not include pedestal 33. It is not required to prevent coupling between the LP02 and LP03 or higher modes.

Figure 10:
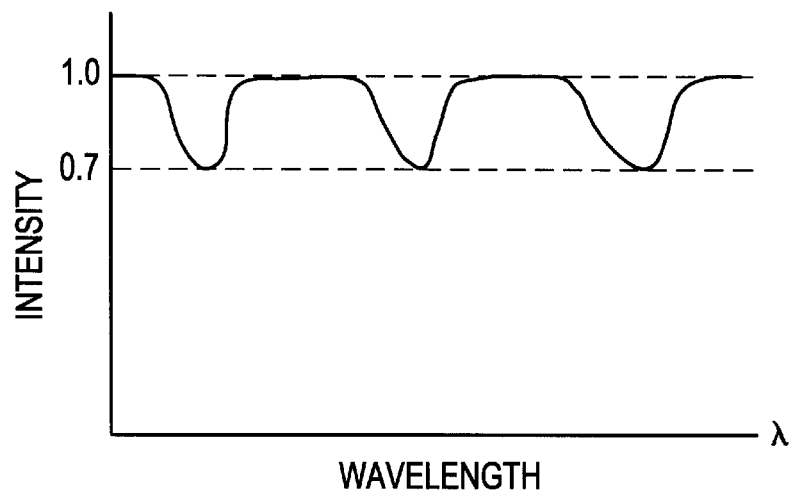
FIG. 10 is a plot of intensity v. wavelength for the Mach-Zehnder according to the second, third, and fourth embodiments configured as a filter for use in a soliton transmission system.

FIG. 10 is a plot of intensity v. wavelength for the Mach-Zehnder according to the second, third, and fourth embodiments configured as a filter for use in a soliton transmission system. As discussed above, optical device 10 can be tuned to produce any number of predetermined spectral responses. In FIG. 10, the Mach-Zehnder device is tuned such that the maxima transmit approximately 100% of the incident light and the minima transmit approximately 70% of the incident light signal. In soliton transmission systems, timing-jitter is a key factor in the performance of soliton communications systems. One way of solving this problem is the use of sliding-frequency filters.

Figure 11:
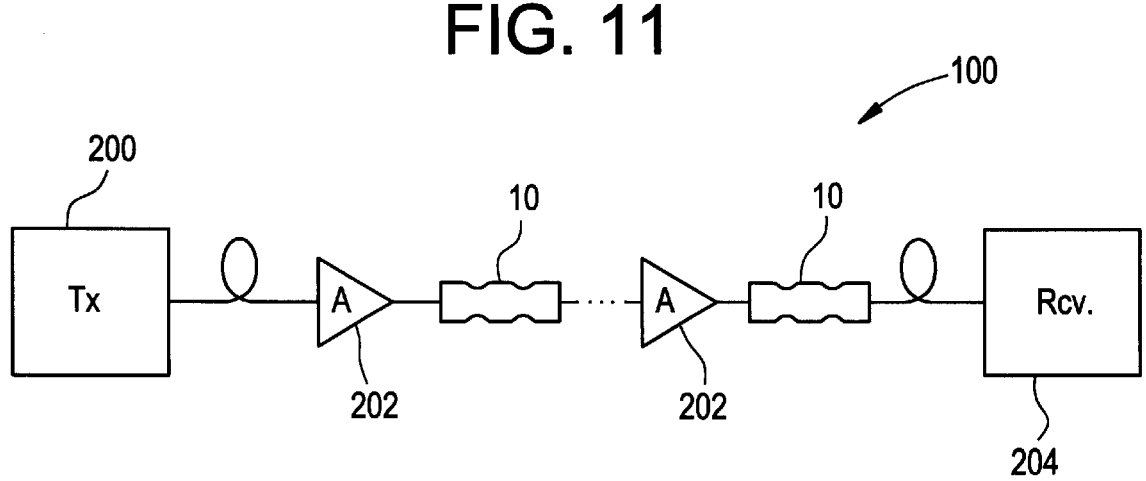
FIG. 11 is a soliton transmission system using the Mach-Zehnder device of FIG. 10.

FIG. 11 is a block diagram of a long-haul soliton transmission system 100 using the Mach-Zehnder device 10 having the spectral response shown in FIG. 10. Transmitter 200 is connected to a amplifier 202. The output of amplifier 202 is connected to Mach-Zehnder filter 10. The amplifiers 202 and filters 10 are distributed in the link to compensate for losses. Theoretically, soliton pulses can be amplified many times without losing their shape. The amplifiers 202 add noise due to amplified spontaneous emission (ASE). Filter 10 is an optical bandpass filter that blocks the unwanted ASE. Each filter 10 is the link has a different center frequency. A series of sliding-frequency filters is formed by increasing the center frequency of successive filters. Timing jitter is reduced because the soliton frequency slides with the filters, whereas the ASE is filtered out.

Figure 12:
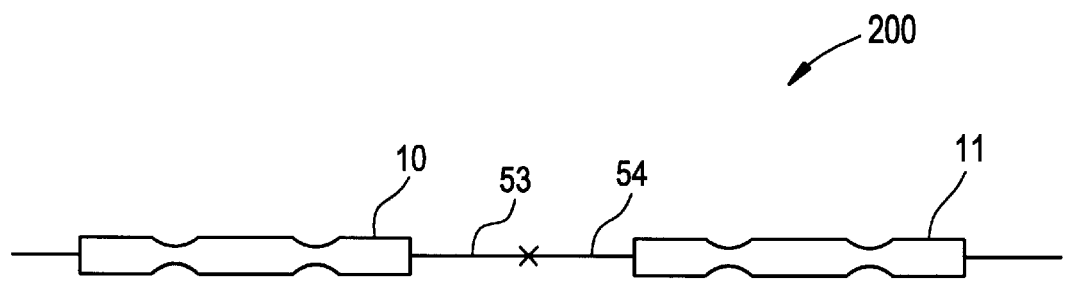
FIG. 12 shows a pair of cascaded Mach-Zehnder devices.
Figure 13A:
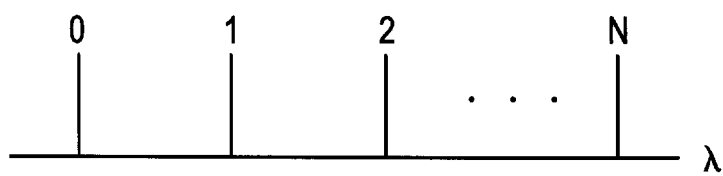
FIGS. 13A–13D depict the channel filtering functionality of a chain of Mach-Zehnders.
Figure 13B:
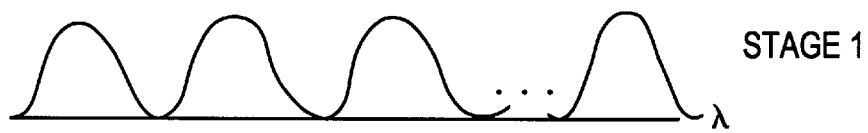
Figure 13C:
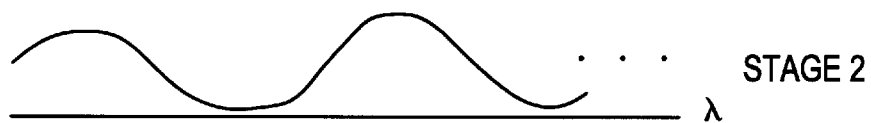
Figure 13D:

As embodied herein and depicted in FIG. 12, a two-stage channel filter 200 is disclosed in a fifth embodiment of the present invention. Output pigtail 53 of Mach-Zehnder 10 is connected to input pigtail 54 of Mach-Zehnder 11. One of ordinary skill in the art will recognize that two or more Mach-Zehnder devices can be concatenated to form an M-stage channel filter.

The output transfer function of optical device 200 is depicted in FIG. 13. FIG. 13A shows the system wavelength channels. In FIG. 13B, the spectral response of a one stage-Mach-Zehnder device is shown. The response is similar to that depicted in FIG. 6 and is repeated here for clarity of illustration. The spectral response of the two-stage device depicted in FIG. 12 is shown in FIG. 13C. Its period is twice that of a single stage device. Each successive Mach-Zehnder added to the chain doubles the size of the period. The spectral response of an M-stage device is shown in FIG. 13D. One of ordinary skill in the art will recognize that the M-stage device functions as a band-pass filter. In FIG. 13D, the band-pass filter is used to isolate channel 0, depicted in FIG. 13A.

Figure 14:
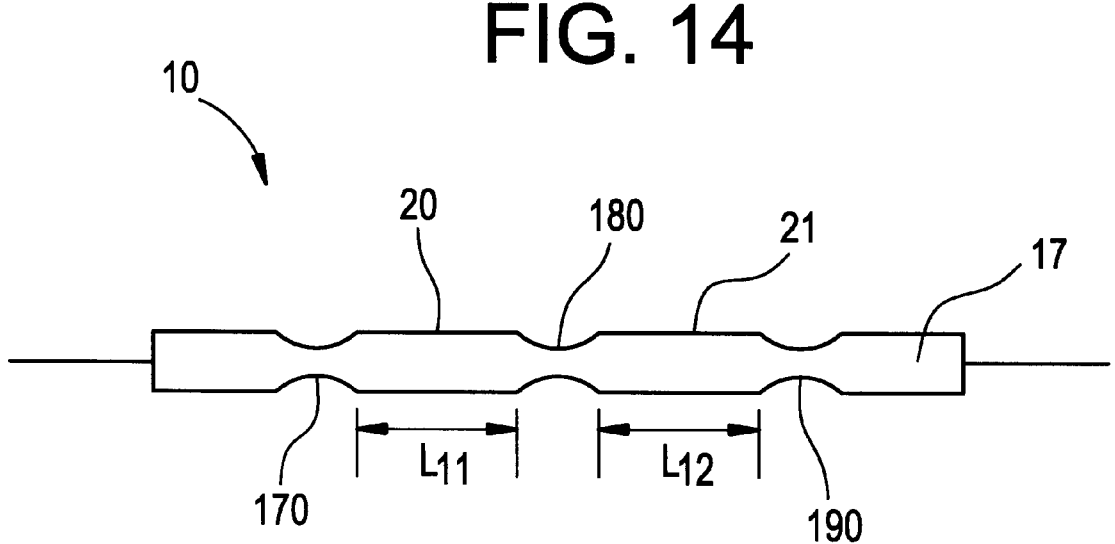
FIG. 14 shows a coaxial lattice device according to the fifth embodiment of the present invention.

As embodied herein and depicted in FIG. 14, a monolithic coaxial overclad lattice filter 10 having three tapers is disclosed according to a sixth embodiment of the present invention. Device 10 includes a body 17 of matrix glass having tapered coupling regions 170, 180, and 190 therein. Phase delay regions 20 and 21 are situated between coupling regions 170, 180 and 190. Phase delay region 20 has a length $L_{11}$ and phase delay region 21 has a length $L_{12}$. Lattice device 10 is tunable to perform a multiplicity of filter functions having spectral responses more complicated than the sinusoidal responses of the Mach-Zehnder devices disclosed above. However, the principles disclosed above with respect to the tuning of the Mach-Zehnder coaxial devices also applies to the three-tapered lattice filters disclosed herein. The taper ratio, phase delays lengths $L_{11}$ and $L_{12}$, refractive index trough, pedestal, core diameter, $\Delta$ values and the other features discussed above are used to obtain the desired spectral response.

Figure 15A:
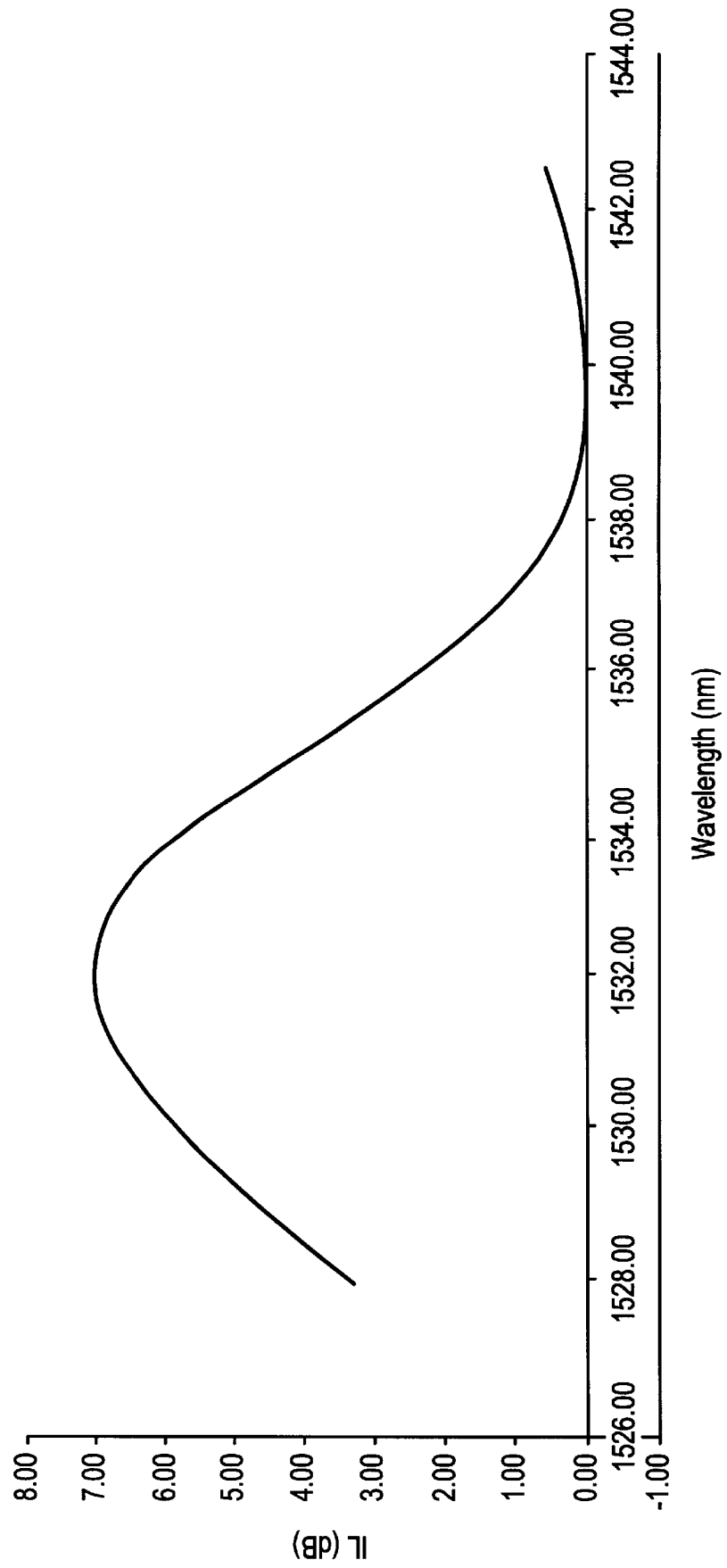
FIGS. 15A–15D are plots illustrating examples of spectral responses obtained from the coaxial lattice device shown in FIG. 14.
Figure 15B:
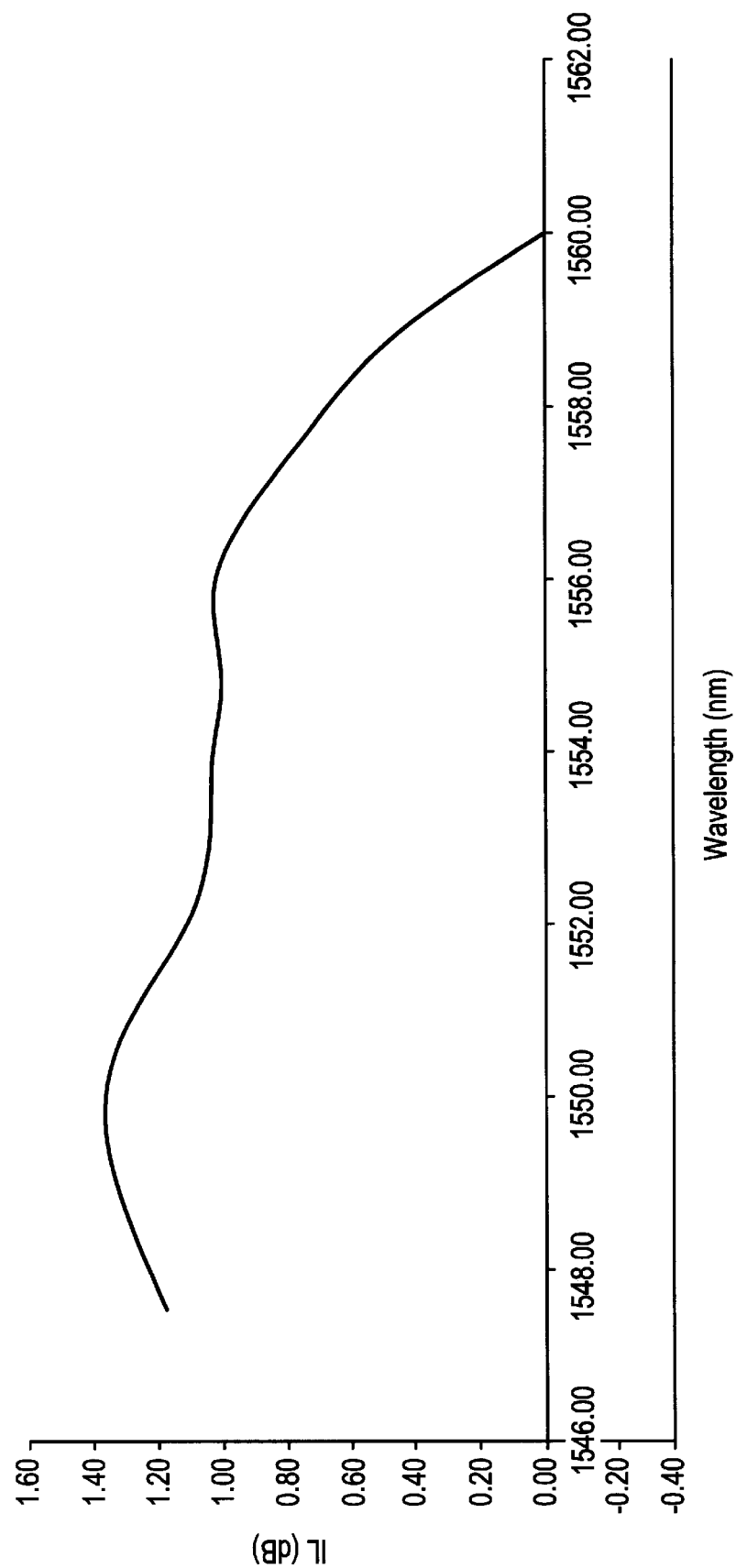
Figure 15C:
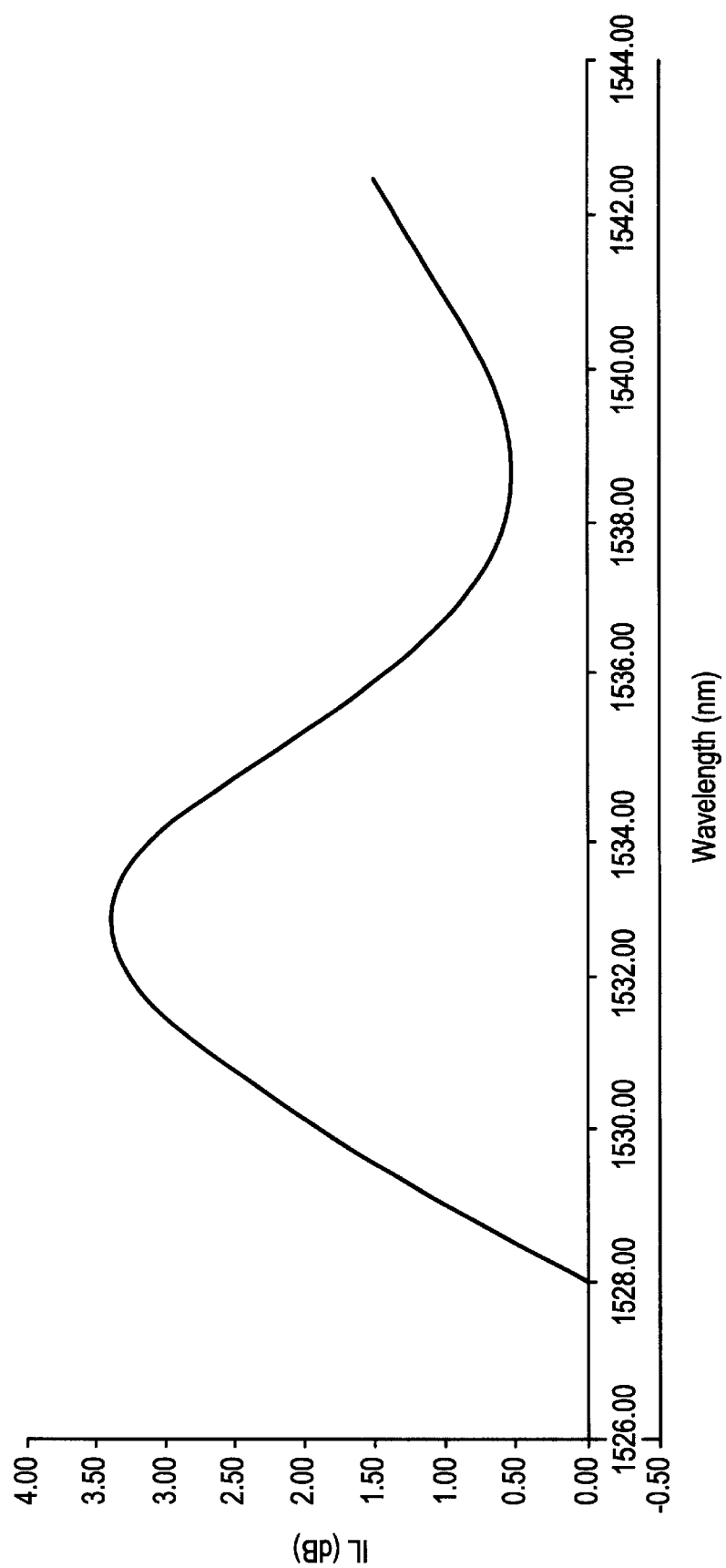
Figure 15D:
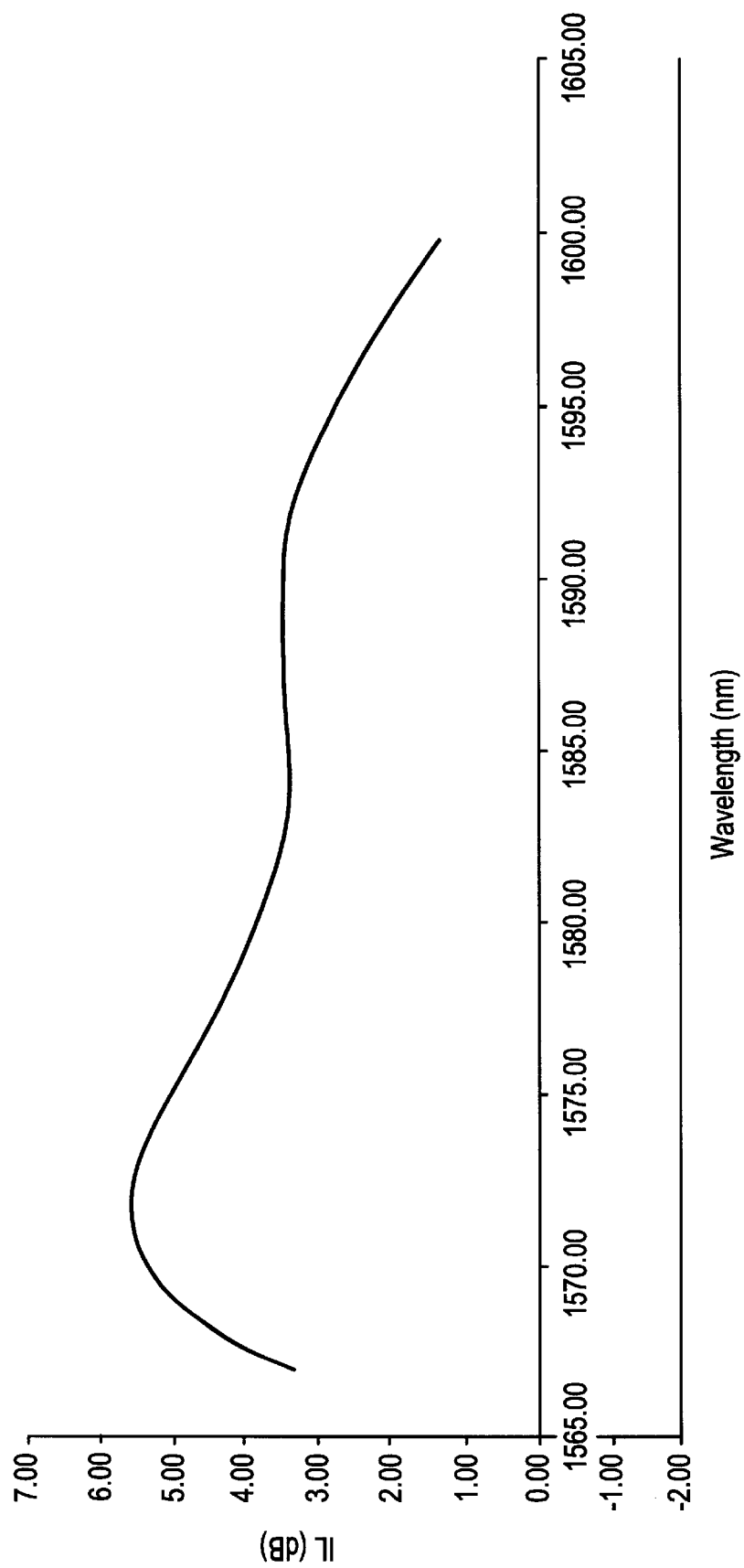

FIGS. 15A–15D are plots illustrating examples of spectral responses obtained from the coaxial lattice device 10 shown in FIG. 14. FIG. 15A shows a spectral response that is substantially Gaussian in shape. This Gain flattening filter 10 attenuates the signal in a spectral window from 1528 nm to 1540 nm. This filter is characterized by a maximum insertion loss at approximately 1532 nm, which corresponds to a spike in gain spectrum of an erbium doped fiber amplifier. The maximum insertion loss at 1532 nm is approximately 7.0 dB. FIG. 15C depicts a spectral response that is very similar to the one depicted in FIG. 15A. This filter has a smaller window, between 1528 nm and 1538 nm. Its maximum insertion loss is 3.5 dB at 1533 nm. Lattice filter 10 can be tuned to filter any portion of the spectrum. FIG. 15B depicts a spectral response that covers the red wavelengths in an approximate spectral window between 1548 nm to 1560 nm. This response is characterized by a maxima at 1550 nm followed by a non-linear curve that monotonically decreases as wavelength increases. FIG. 15D depicts an L-band filter response having a spectral window between 1565 nm and 1600 nm. The response of this filter is very similar to that depicted in FIG. 15B and is characterized by a maxima at 1572 nm followed by a non-linear curve that monotonically decreases as wavelength increases. As discussed above, the invention should not be limited to the responses shown in FIGS. 15A–15D. Lattice device 10 is versatile and lends itself to a variety of applications.

Figure 16:
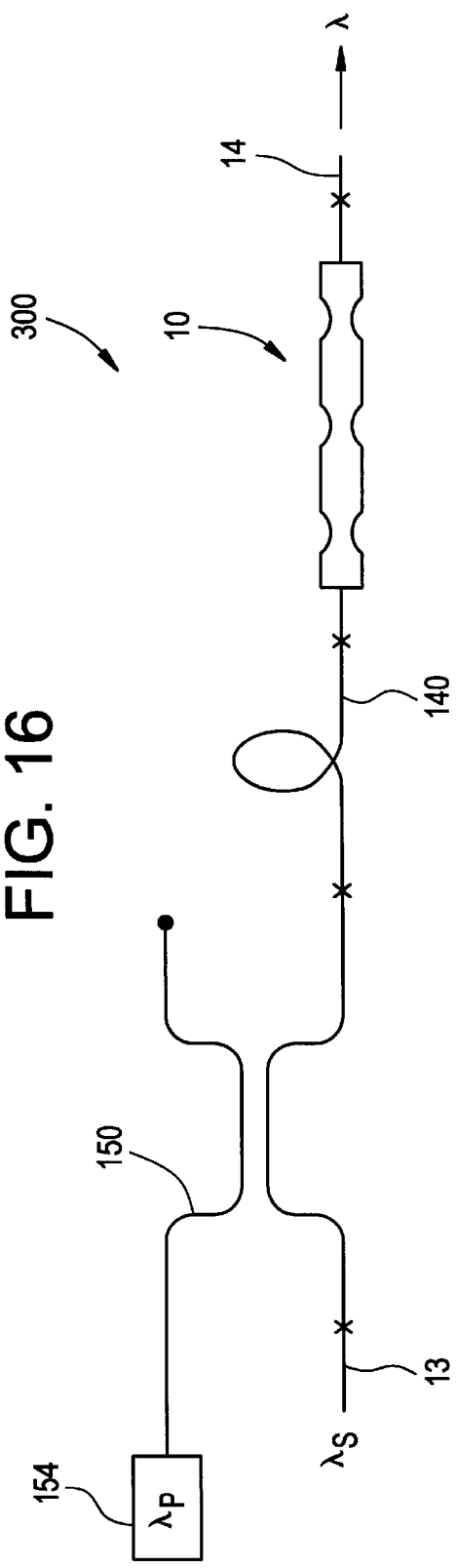
FIG. 16 is a Raman amplifier using the coaxial lattice device of FIG. 14.

As embodied herein and depicted in FIG. 16, a Raman amplifier using the coaxial lattice device of FIG. 14 is disclosed. Optical pump 154 supplies a pump signal to coupler 150. The optical signal is directed into coupler 150 from communications fiber 13. Energy is transferred from the pump signal to the optical signal as the two signals propagate in fiber 140. Spontaneous Raman scattering due to shot noise occurs over a wide frequency range and limits the effectiveness of the amplifier. Lattice filter 10 improves the performance of the Raman amplifier because it is tunable over a broad band of wavelengths.

Figure 17:
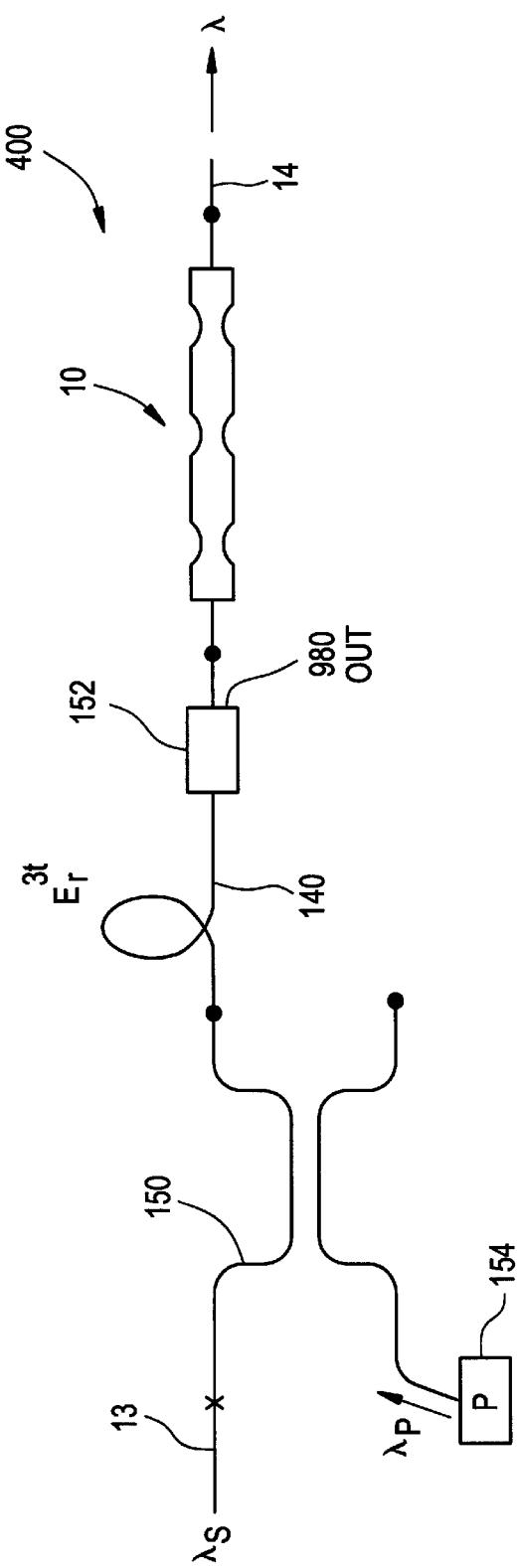
FIG. 17 is an erbium doped fiber amplifier using the coaxial device of FIG. 14.

As embodied herein and depicted in FIG. 17, an erbium doped fiber amplifier using the coaxial device of FIG. 14 is disclosed. Optical pump 154 supplies a pump signal to wavelength selective coupler 150. The optical signal is directed into coupler 150 from communications fiber 13. Erbium doped fiber 140 is connected to the output of coupler 150 and the signal is amplified by a stimulated emission of erbium ions caused by the pump signal. Isolator 152 is connected to erbium fiber 140 and decouples the 980 nm pump signal from the optical signal.

Figure 18:
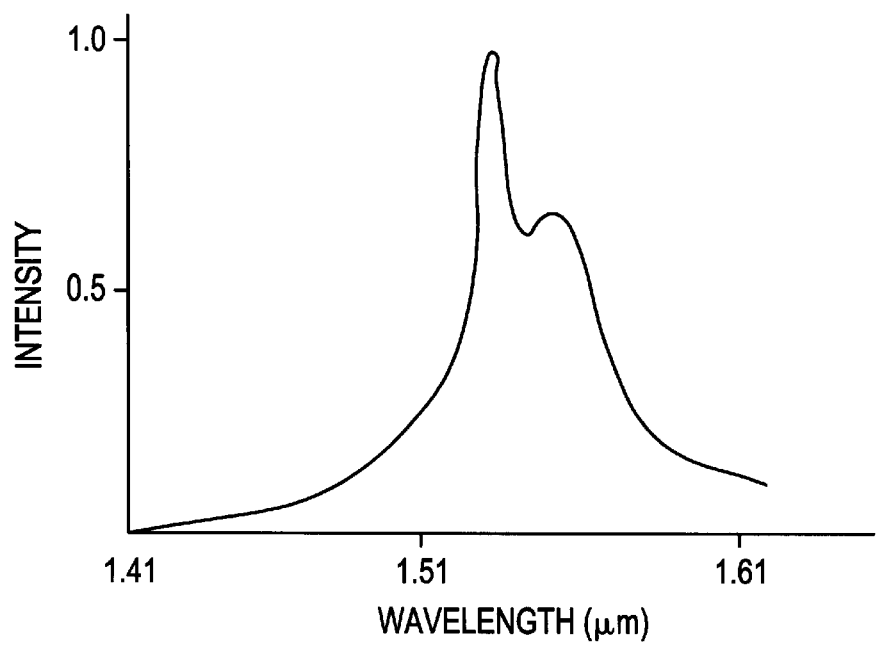
FIG. 18 is plot of intensity v. wavelength of the erbium gain spectrum in a silica glass host.

FIG. 18 is plot of intensity v. wavelength of the erbium gain spectrum in a silica glass host. Erbium doped fiber is very important in amplifier applications as will be discussed below. Note the peak in the gain spectrum centered near the 1530 nm region. Bandpass filters are needed at the output of the EDFA for gain equalization. Thus, lattice filter 10 is connected to isolator 152 and functions as a Gain flattening filter. The spectral responses depicted in FIGS. 15A and 15C are appropriate for this application. These responses have attenuation bands designed to flatten the peak of the erbium gain spectrum.

Figure 20:
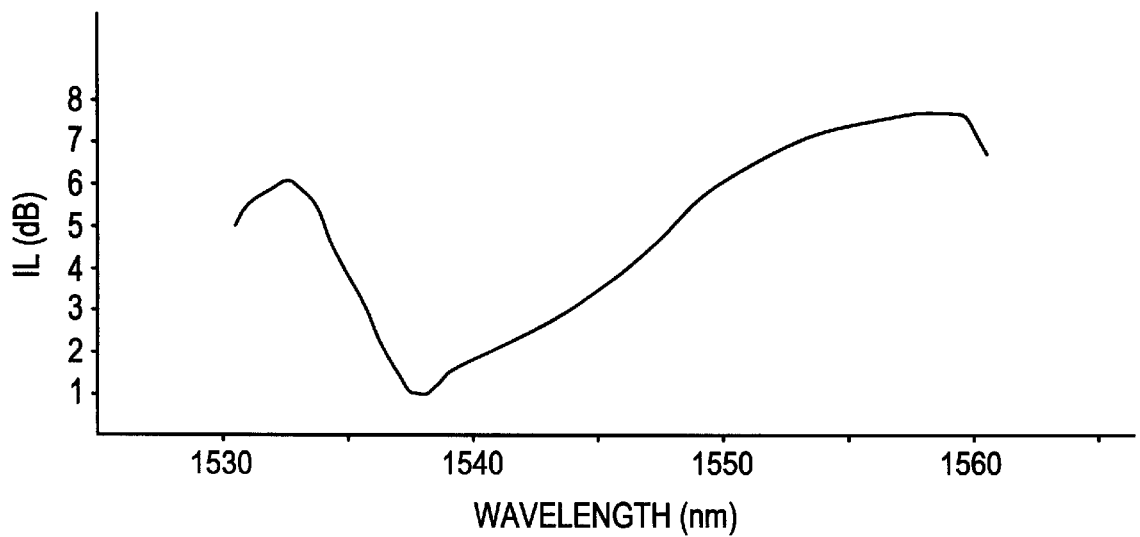
FIG. 20 is a special response of the gain flattening filter depicted in FIG. 20.

As embodied herein and depicted in FIG. 19, a gain flattening filter 700 is fabricated by cascading three taper lattice device 71 with three taper lattice device 72. Filter 700 is particularly useful in the erbium doped amplifier applications discussed above. FIG. 20 is one spectral response achievable using the gain flattening filter depicted in FIG. 19. This complex shape is enabled by the two-three taper design. It produces a mirror-image of the erbium spectrum in the 1530–1540 nm window and results in extremely flat gain in this spectral window.

As embodied herein and depicted in FIG. 21, a gain flattening filter produced by cascading a Mach-Zehnder device 71 with a three taper lattice device 72 is disclosed. This filter design can also be tuned to provide a complex spectral response.

Figure 22:
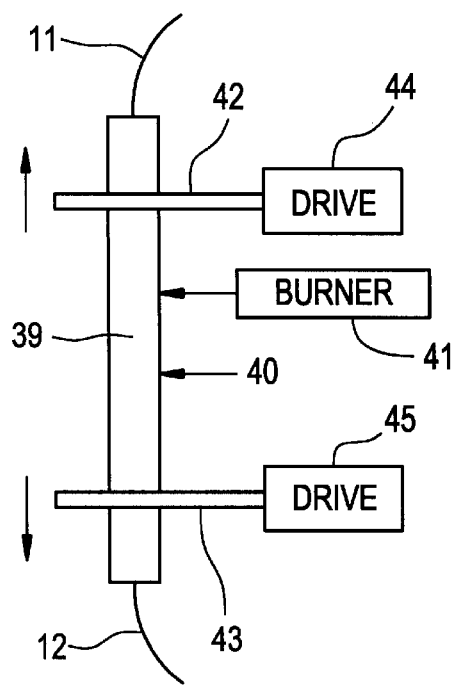
FIG. 22 is a schematic illustration of an apparatus for collapsing a capillary tube onto a fiber and stretching the tube to form a coupling region.

FIG. 22 is a schematic illustration of an apparatus for collapsing a capillary tube onto a fiber and stretching the tube to form a coupling region. The optical devices 10 of the present invention can be formed of a tube having a composition that varies with radius as disclosed in U.S. Pat. No. 5,251,277. If such a tube is employed, the inner portion thereof would contain silica and the refractive index lowering dopant.

Device fibers can be made by a process similar to that disclosed in U.S. Pat. No. 5,295,211, which is incorporated herein by reference. A porous core preform comprising a core region and a thin layer of cladding glass is formed on a cylindrical mandrel. The mandrel is removed, and the resultant tubular preform is gradually inserted into a consolidation furnace muffle, the maximum temperature of which is between 1200° C. and 1700° C., preferably about 1490° C. for high silica content glass. Chlorine, which is normally present during the preform consolidation step to achieve drying, may be supplied to the preform by flowing into the preform aperture a drying gas consisting of helium and chlorine. A minimum of about 1 vol. % chlorine is required in the drying gas mixture to achieve adequate drying of the core. The end of the aperture is plugged to cause the gas to flow through the preform pores. A helium flushing gas is simultaneously flowed through the muffle. About 0.06–0.07 wt. % chlorine remains in the consolidated preform after this first dry/consolidation step. The resultant tubular glass article is heated and stretched in a standard draw furnace while a vacuum is applied to the aperture to form a "core rod" in which the aperture has been closed.

A suitable length of the core rod is supported in a lathe where particles of silica are deposited thereon. The coated rod is dried and consolidated in a furnace muffle through which a mixture of helium and 9 volume % chlorine is flowed.

The resultant sintered intermediate rod is supported in a lathe where particles of silica are deposited thereon. This final porous preform is inserted into a consolidation furnace where it is subjected to a third dry/consolidation step while a mixture of helium and 0.6 volume % chlorine is flowed upwardly through the muffle. This outer portion of the preform will constitute cladding 34 (FIG. 3) of fiber 25.

Figure 23:
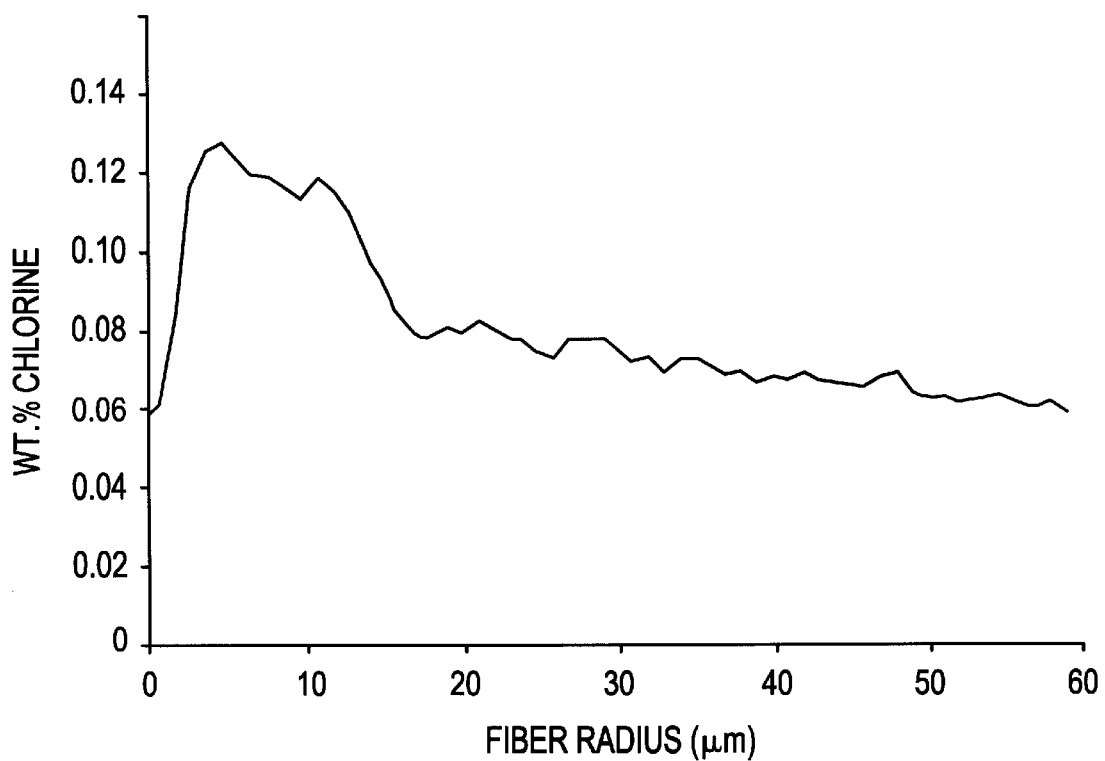
FIG. 23 is a plot of chlorine concentration v. fiber radius for a specific device optical fiber.

The resultant fiber preform is drawn to form an optical fiber. The amount of cladding glass particles applied to the core rod to form the intermediate preform determines the radius of the pedestal. The amount of chlorine to which the porous portion of the preform is subjected in the second and third drying/consolidation steps determines the value of $\Delta_{5-2}$. FIG. 23 is a plot of chlorine concentration v. fiber radius for a specific device optical fiber.

When the device fiber 25 was formed in accordance with the above method whereby the cladding consisted of silica containing a minimal amount of chlorine to achieve drying and the pedestal consisted of silica containing more than about 0.12 wt. % chlorine, lowest excess loss was achieved by employing a matrix glass body of silica doped with more than 4 wt. % $B_2O_3$. To characterize this feature, three types of devices were made. The devices were similar except for the boron content in body 17. Device excess loss was about 1.0 dB and about 0.8 dB when the tube consisted of silica doped with 2 wt. % $B_2O_3$ and 4 wt. % $B_2O_3$, respectively. There was essentially no excess loss when the device was made from a tube formed of silica doped with 8 wt. % $B_2O_3$.

As noted above, fluorine can also be employed as the refractive index-decreasing dopant. Regardless of whether $B_2O_3$ or fluorine is employed, $\Delta_{2-3}$ should be greater than 0.1% to achieve devices that exhibit low excess loss.

The device is formed in accordance with methods disclosed in U.S. Pat. Nos. 5,011,251 and 5,295,205, which are incorporated herein by reference. Referring to FIGS. 2 and 4, a length of coating slightly shorter than the length of matrix glass tube 39 is removed from a central region of a length of coated fiber. Those portions of the coated fiber at opposite ends of the stripped region will constitute the coated fiber pigtails 11 and 12. The bare glass fiber 25 is inserted into the bore of tube 39 such that fiber coatings 26 and 27 extend into funnels that are provided at the ends of the tube bore to facilitate fiber insertion. The combination of fiber and tube is referred to as a coupler preform 40.

Referring to FIG. 22, preform 40 is inserted through a ring burner and is clamped to draw chucks 42 and 43 which are mounted on motor controlled stages 44 and 45. The burner is schematically represented as box 41, the arrow extending therefrom representing the flame. The fiber is threaded through vacuum attachments (not shown) which are then sealed to the ends of preform 40. Typical vacuum attachments are disclosed in U.S. Pat. No. 5,011,251.

That portion of the tube between points a and b (FIG. 4) is initially collapsed onto the fiber. This is accomplished by evacuating the bore through the vacuum attachments and heating the tube near one end to cause it to collapse at the region of applied heat. Chucks 42 and 43 move the preform relative to the burner to gradually extend the collapsed region toward the opposite end of the tube until the desired length of collapsed tube is obtained.

Tapered region 18 is formed near one end of the preform by heating a region of the tube and moving computer controlled stages 45 and 46 in opposite directions to stretch the heated region. The tube stretching operation can be performed in accordance with the teachings of U.S. Pat. No. 5,011,251. It is known that the coupling characteristics of the resultant tapered region are determined by such parameters as the optical and mechanical characteristics of tube 39 and fiber 25 and of such taper parameters as the length and shape of the tapered regions.

Thereafter, the tube is moved with respect to the burner, and the second tapered region 19 is similarly formed. Glue 28 and 29 can be added to the ends of the tube to improve the pull strength of the fiber pigtails.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for filtering a light signal, said optical device having a tunable spectral response, said optical device comprising:
   a first optical fiber having a first core and a first cladding with refractive index $n_2$, said first core includes a first central region having a refractive index $n_1$; and
   a first fiber coupling regulator integral with said first optical fiber, said first fiber coupling regulator couples the light signal between a first optical path and second optical path and substantially prevents the light signal from coupling into a third optical path;
   wherein the first fiber coupling regulator includes:
      a first optical coupler integral to the first optical fiber for coupling the light signal between the first path and the second path and producing a first output signal, wherein the first path is a $LP_{01}$ mode of the light signal and the second path is a $LP_{02}$ mode of the light signal; and
      a first coupling inhibitor integral with at least one of said first optical coupler or the first optical fiber, said first coupling inhibitor substantially prevents the light signal from coupling into the third path, wherein the third path is any mode of the light signal higher than said $LP_{02}$ mode;
   wherein the first optical coupler includes a tapered region in the first optical fiber, wherein said tapered region is characterized by a taper ratio defined as a change in a radius of the first optical fiber over a change in a length of said tapered region; and
   wherein the first optical coupler comprises a trough region disposed in the first core between the first central region and the first cladding, said trough region having a refractive index $n_6$, wherein $n_1 > n_2 > n_6$.

2. The optical device according to claim 1, wherein the first coupling inhibitor comprises a refractive index pedestal in the first core region, disposed between the first central region and first cladding, said refractive index pedestal region having a refractive index $n_5$, wherein, $n_1 > n_5 > n_2$.

3. The optical device according to claim 1, wherein the tapered region is characterized by a taper ratio approximately equal to 3 to 1.

4. The optical device according to claim 1, wherein the first coupling inhibitor comprises a refractive index pedestal region disposed in the first core region between the trough region and the first cladding, said refractive index pedestal region having a refractive index $n_5$, wherein $n_1 > n_5 > n_2 > n_6$.

5. The optical device according to claim 4, wherein the trough region has a radial dimension in an approximate range between 3 microns and 10 microns, and $\Delta_{1-6}$ is within an approximate range between 0.1% and 0.4%.

6. The optical device according to claim 1, wherein the first coupling inhibitor comprises the tapered region and the tapered region is characterized by a taper ratio of less than 2 to 1, such that inter-modal coupling is inhibited.

7. The optical device according to claim 6, wherein the trough region has a radial dimension in an approximate range between 5 microns and 10 microns and $\Delta_{1-6}$ is within an approximate range between 0.03% and 0.07%, such that inter-modal coupling between the $LP_{01}$ mode and the $LP_{02}$ mode is enabled.

8. An optical device for filtering a light signal, said optical device having a tunable spectral response, said optical device comprising:
   a first optical fiber having a first core and a first cladding with refractive index $n_2$, said first core includes a first central region having a refractive index $n_1$; and
   a first fiber coupling regulator integral with said first optical fiber, said first fiber coupling regulator couples the light signal between a first optical path and second optical path and substantially prevents the light signal from coupling into a third optical path;
   wherein the first fiber coupling regulator includes:
      a first optical coupler integral to the first optical fiber for coupling the light signal between the first path and the second path and producing a first output signal, wherein the first path is a $LP_{01}$ mode of the light signal and the second path is a $LP_{02}$ mode of the light signal; and
      a first coupling inhibitor integral with at least one of said first optical coupler or the first optical fiber, said first coupling inhibitor substantially prevents the light signal from coupling into the third path, wherein the third path is any mode of the light signal higher than said $LP_{02}$ mode;
   wherein the first optical coupler comprises a trough region disposed in the first core between the first central region and the first cladding, said trough region having a refractive index $n_6$, wherein $n_1 > n_2 > n_6$;
   wherein the first fiber coupling regulator further includes:
      a second optical coupler integral to the first optical fiber and spaced apart from the first optical coupler by a phase delay distance $L_{11}$, said second optical coupler couples the first output signal between the $LP_{01}$ mode of the first output signal and the $LP_{02}$ mode of the first output signal to produce a second output signal, wherein the first coupler and the second coupler form a Mach-Zehnder device; and
      a second coupling inhibitor integral with at least one of said second optical coupler or the first optical fiber, said second coupling inhibitor substantially prevents the first output signal from coupling into any mode of the output signal higher than said $LP_{02}$ mode.

9. The optical device according to claim 8, wherein the first optical coupler comprises a first tapered region that is characterized by a first taper ratio and the second optical coupler comprises a second tapered region that is characterized by a second taper ratio, wherein said first taper ratio and said second taper ratio are defined as a change in a radius of the first optical fiber over a change in a length of the first optical fiber.

10. The optical device according to claim 9, wherein the spectral response is tunable as a function of the first taper ratio, the second taper ratio, and the phase delay distance $L_{11}$.

11. The optical device according to claim 10, wherein the spectral response includes channel wavelength $\lambda_c$, a wavelength channel pass-band, a wavelength channel stop-band, and a gain as a function of wavelength.

12. The optical device according to claim 11, wherein the spectral response is a periodic function approximately sinusoidal in shape having a first period that includes a maximum and minimum, wherein said maximum corresponds to the wavelength channel pass-band and said minimum corresponds to the wavelength channel stop-band.

13. The optical device according to claim 12, wherein the maxima transmit approximately 100% of the light signal and the minima transmit approximately 70% of the light signal.

14. An optical fiber transmission system comprising:
at least one soliton transmitter for modulating data and transmitting soliton pulses over a channel wavelength to carry said data;
an optical fiber connected to said soliton transmitter for propagating said solition pulses;
at least one amplifier connected to said optical fiber for amplifying said soliton pulses;
the optical device of claim 13 connected to said at least one amplifier and tuned to a center frequency; and
at least one soliton receiver connected to said optical fiber for demodulating said soliton pulses and recovering said data;
wherein the at least one amplifier comprises a plurality of amplifiers that are spaced apart in the transmission system, wherein the center frequency of each of the optical devices of claim 13 connected to said plurality of amplifiers is different, forming a series of sliding-frequency filters that substantially reduce a timing-jitter of the transmission system.

15. An optical device according to claim 12, further comprising:
a second optical fiber connected to the first optical fiber, said second optical fiber having a second core and a second cladding with refractive index $n_4$, said second core includes a second central region having a refractive index $n_3$; and
a second fiber coupling regulator integral with said second optical fiber, said second fiber coupling regulator couples the light signal between the first optical path and the second optical path and substantially prevents the light signal from coupling into the third optical path.

16. The optical device according to claim 15, wherein the second fiber coupling regulator comprises:
a third optical coupler integral to the second optical fiber for coupling the light signal between the first path and the second path and producing a third output signal; and
a third coupling inhibitor integral with at least one of said third optical coupler or the second optical fiber, said second coupling inhibitor substantially prevents the light signal from coupling into the third path.

17. The optical device according to claim 16, wherein the second fiber coupling regulator further comprises:
a fourth optical coupler integral to the second optical fiber and spaced apart from the third optical coupler by a phase delay distance $L_{21}$, said fourth optical coupler couples the third output signal between the first path and the second path and produces a fourth output signal, wherein the third coupler and the fourth coupler form a Mach-Zehnder device; and
a fourth coupling inhibitor integral with at least one of said fourth optical coupler or the second optical fiber, said fourth coupling inhibitor substantially prevents the third output signal from coupling into the third path.

18. The optical device according to claim 17, wherein the spectral response is a periodic function approximately sinusoidal in shape and having a second period that is twice that of the first period.

19. The optical device according to claim 8, wherein the first fiber coupling regulator further comprises:
a third optical coupler integral to the first optical fiber and spaced apart from the second optical coupler by a phase delay distance $L_{12}$, said third optical coupler couples the second output signal between the first path and the second path to produce a third output signal, wherein the first optical coupler, second optical coupler and said third optical coupler form a lattice-filter device; and
a third coupling inhibitor integral with at least one of said third optical coupler or the first optical fiber, said third coupling inhibitor being a material property that substantially prevents the second output signal from coupling into the third path.

20. The optical device according to claim 19, wherein the first optical coupler comprises a first tapered region that is characterized by a first taper ratio, the second optical coupler comprises a second tapered region that is characterized by a second taper ratio, and the third optical coupler comprises a third tapered region that is characterized by a third taper ratio, wherein said first taper ratio, said second taper ratio and said third taper ratio are defined as a change in a radius of the first optical fiber over a change in a length of the first optical fiber.

21. The optical device according to claim 20, wherein the spectral response is tunable as a function of the first taper ratio, the second taper ratio, the third taper ratio and the phase delay distances $L_{11}$ and $L_{12}$.

22. The optical device according to claim 21, wherein the spectral response is tuned to thereby cause an insertion loss of the optical device to vary as a function of wavelength such that a predetermined spectral window is filtered.

23. A fiber Raman amplifier system comprising:
an optical pump for supplying a pump signal;
a WDM coupler having a first input connected to said pump and a second input connected to the light signal;
an optical fiber connected to an output of said WDM coupler, wherein energy is transferred from said pump signal to the light signal by stimulated Raman scattering; and
a broadband filter comprising the optical device according to claim 22 connected to said optical fiber for filtering the light signal.

24. An erbium doped fiber amplifier system comprising:
an optical pump for supplying a pump signal;
a wavelength selective coupler having a first input connected to the light signal and a second input connected to said optical pump;

an erbium doped fiber connected to an output of said wavelength selective coupler, wherein an output light signal is amplified by a stimulated emission of erbium ions caused by said pump signal;

an isolator connected to said erbium doped fiber; and a gain flattening filter comprising the optical device according to claim 22, wherein the transfer function causes a gain of the output light signal to be substantially uniform in the predetermined spectral.

25. An optical fiber transmission system comprising:

a first network element for transmitting the light signal;

an optical fiber for propagating the light signal;

the erbium doped fiber amplifier system according to claim 24; and a second network element for receiving the light signal.

26. An optical device according to claim 19, further comprising:

a second optical fiber connected to the first optical fiber, said second optical fiber having a second core and a second cladding with refractive index $n_4$, said second core includes a second central region having a refractive index $n_3$, wherein $n_3 > n_4$; and a second fiber coupling regulator integral with said second optical fiber, said second fiber coupling regulator couples the light signal between the first optical path and the second optical path and substantially prevents the light signal from coupling into the third optical path.

27. The optical device according to claim 26, wherein the second fiber coupling regulator comprises:

a fourth optical coupler integral to the second optical fiber for coupling the light signal between the first path and the second path and producing a fourth output signal;

a fourth coupling inhibitor integral with at least one of said fourth optical coupler or the second optical fiber, said second coupling inhibitor substantially prevents the light signal from coupling into the fourth path;

a fifth optical coupler integral to the second optical fiber and spaced apart from said fourth optical coupler by a phase delay distance $L_{21}$, said fifth optical coupler couples said fourth output signal between the first path and the second path and produces a fifth output signal, wherein said fourth coupler and said fifth coupler form a Mach-Zehnder device; and a fifth coupling inhibitor integral with at least one of said fifth optical coupler or the second optical fiber, said fifth coupling inhibitor substantially prevents the fourth output signal from coupling into the third path.

28. The optical device according to claim 27, wherein the second fiber coupling regulator further comprises:

a sixth optical coupler integral to the second optical fiber and spaced apart from said fifth optical coupler by a phase delay distance $L_{22}$, said sixth optical coupler couples said fifth output signal between the first path and the second path and produces a sixth output signal, wherein said fifth coupler and said sixth coupler form a Mach-Zehnder device; and a sixth coupling inhibitor integral with at least one of said sixth optical coupler or the second optical fiber, said sixth coupling inhibitor substantially prevents the fifth output signal from coupling into the third path.

29. The optical device according to claim 27, wherein the spectral response is a mirror image of an erbium gain spectrum in a silica glass host with aluminum co-doping.

30. A coaxial device for operation at an operating wavelength $\lambda_o$, said device comprising a single optical fiber having a core having a maximum refractive index $n_1$ surrounded by a cladding having a maximum refractive index $n_2$, a refractive index pedestal having a maximum refractive index $n_5$ situated between said core and cladding, wherein $n_1 > n_5 > n_2$, and a refractive index trough having a maximum refractive index $n_6$ situated between said core and said refractive index pedestal, wherein $n_1 > n_5 > n_6$, at least one tapered region in said fiber, that portion of said fiber that extends from one end of said tapered region having a protective coating thereon and constituting a fiber pigtail, the taper angle of said tapered region being sufficiently great to cause coupling between the LP01 and the LP02 modes, but not so great as to cause coupling to the LP03 mode, wherein said optical fiber has a cutoff wavelength $\lambda_{co}$ more than 200 nm less than said operating wavelength $\lambda_o$.

31. The device of claim 30, wherein said cutoff wavelength $\lambda_{co}$ is more than 500 nm less than said operating wavelength $\lambda_o$.

32. The device of claim 30, further comprising a medium having a refractive index $n_3$ surrounding said at least one tapered region of said fiber, wherein $n_3 < n_2$.

33. The device of claim 32, wherein $\Delta_{2-3}$ is greater than 0.1 %, where $\Delta_{2-3}$ equals $(n_2^2 - n_3^2)/2n_2^2$.

34. The device of claim 32, wherein said medium comprises an elongated body of matrix glass having two end regions and a midregion, said fiber extending longitudinally within said body and being fused together along with the midregion of said body, said midregion including said at least one tapered region and said phase shift region.

35. The device of claim 32, wherein said medium comprises a base glass and a refractive index decreasing dopant.

36. The device of claim 30, wherein said first fiber pigtail is surrounded by a protective coating, the refractive index of which is sufficiently higher than that of said cladding that said LP02 mode is stripped from said fiber in said first fiber pigtail, said protective coating having a refractive index $n_4$, wherein $n_4 = n_5$.

37. The device of claim 30, wherein the radius $r_p$ of said pedestal in said phase shift region is between 10 $\mu$m and 25 $\mu$m.

38. The device of claim 37, wherein the radius $r_p$ is less than 15 $\mu$m.

39. The device of claim 30, wherein said fiber contains chlorine, the amount of chlorine in said pedestal being greater than the amount of chlorine in said cladding.

40. The device of claim 30, wherein said core contains silica and a refractive index increasing dopant, and wherein said pedestal contains silica and a refractive index increasing dopant.

41. The device of claim 40, wherein said core and said pedestal contain the same refractive index increasing dopant.

42. The device of claim 30, wherein $\Delta_{5-2}$ is in the range 0.01% to 0.05%, where $\Delta_{5-2}$ equals $(n_5^2 - n_2^2)/2n_2^2$.

43. The device of claim 30, wherein said at least one tapered region comprises a plurality of tapered regions.

44. A coaxial device comprising:

a single optical fiber having a core having a maximum refractive index $n_1$ surrounded by a cladding having a maximum refractive index $n_2$, a refractive index pedestal having a maximum refractive index $n_5$ situated between said core and cladding, wherein $n_1 > n_5 > n_2$, and a refractive index trough having a maximum refractive index $n_6$ situated between said core and said refractive index pedestal, wherein $n_1 > n_5 > n_6$;

at least first and second axially spaced tapered regions along said fiber;

a phase shift region of said fiber extending between said tapered regions and a first fiber pigtail extending from that end of said first tapered region opposite said phase shift region; and the taper angles of said tapered regions being sufficiently great to cause coupling between the LP01 and the LP02 modes, but not so great as to cause coupling to the LP03 mode.

45. The device of claim 44, wherein said device functions at a given operating wavelength $\lambda_o$, and said optical fiber has a cutoff wavelength $\lambda_{co}$ more than 200 nm less than said operating wavelength $\lambda_o$.

46. The device of claim 45, wherein said cutoff wavelength $\lambda_{co}$ is more than 500 nm less than said operating wavelength $\lambda_o$.

47. The device of claim 45, wherein said core and said pedestal contain the same refractive index increasing dopant.

48. The device of claim 45, wherein said core and said pedestal contain different refractive index increasing dopants.

49. The device of claim 44, further comprising a medium having a refractive index $n_3$ surrounding said tapered regions of said fiber, wherein $n_3 < n_2$.

50. The device of claim 49, wherein $\Delta_{2-3}$ is greater than 0.1%.

51. The device of claim 49, wherein said medium comprises an elongated body of matrix glass having two end regions and a midregion, said fiber extending longitudinally within said body and being fused together along with the midregion of said body, said midregion including said tapered regions and said phase shift region.

52. The device of claim 49, wherein said medium comprises a base glass and a refractive index decreasing dopant.

53. The device of claim 44, wherein said first fiber pigtail is surrounded by a protective coating, the refractive index of which is sufficiently higher than that of said cladding that said LP02 mode is stripped from said fiber in said first fiber pigtail, said protective coating having a refractive index $n_4$, wherein $n_4 = n_5$.

54. The device of claim 44, wherein the radius $r_p$ of said pedestal in said phase shift region is between 10 $\mu$m and 25 $\mu$m.

55. The device of claim 54, wherein the radius $r_p$ is less than 15 $\mu$m.

56. The device of claim 44, wherein said fiber contains chlorine, the amount of chlorine in said pedestal being greater than the amount of chlorine in said cladding.

57. The device of claim 44, wherein said core contains silica and a refractive index increasing dopant, and wherein said pedestal contains silica and a refractive index increasing dopant.

58. A method for filtering a light signal with an optical device having a predetermined spectral response comprising:

providing a first fiber having:
  a first cladding, said first cladding having a refractive index $n_2$; and
  a first core disposed within said first cladding, said first core including:
    a first central region having a refractive index $n_1$, and
    a trough region disposed in the first core between the first central region and the first cladding, said trough region having a refractive index $n_6$, wherein $n_1 > n_2 > n_6$;

providing a first fiber coupling regulator integral with said first optical fiber;

directing the light signal into the first optical fiber; and coupling the light signal from an $LP_{01}$ mode into an $LP_{02}$ mode, wherein said first fiber coupling regulator couples the light signal between a $LP_{01}$ mode and $LP_{02}$ mode and substantially prevents the light signal from coupling into a $LP_{03}$ mode.

59. The method according to claim 58, wherein the step of providing a first fiber coupling regulator includes tuning the spectral response.

60. The method according to claim 59, optical device according to claim 11, wherein the spectral response is a periodic function approximately sinusoidal in shape having maxima and minima, and a first period that includes a maximum and minimum, wherein said maximum corresponds to the wavelength channel pass-band and said minimum corresponds to the wavelength channel stop-band.

61. The method according to claim 60, wherein the maxima transmit approximately 100% of the light signal and the minima transmit approximately 70% of the light signal.

62. The method according to claim 58, wherein the step of providing a first fiber coupling regulator includes tuning the spectral response to thereby cause an insertion loss of the optical device to vary as a function of wavelength such that a predetermined spectral window is filtered.

63. The method according to claim 58, further comprising the steps of:

providing a second optical fiber connected to the first optical fiber, said second optical fiber having a second core and a second cladding with refractive index $n_4$, said second core includes a second central region having a refractive index $n_3$, wherein $n_3 > n_4$; and providing a second fiber coupling regulator integral with said second optical fiber, said second fiber coupling regulator couples the light signal between the first optical path and the second optical path and substantially prevents the light signal from coupling into the third optical path.

64. The method according to claim 63, wherein the spectral response is a mirror image of an erbium gain spectrum in a silica glass host with aluminum co-doping.

* * * * *